Nov. 25, 1947. N. D. PRESTON Re. 22,939

CODED TRACK CIRCUIT SIGNALING SYSTEM

Original Filed Aug. 19, 1942 11 Sheets-Sheet 1

CODED TRACK CIRCUIT SIGNALING SYSTEM

Original Filed Aug. 19, 1942 11 Sheets-Sheet 2

INVENTOR
Neil D. Preston

CODED TRACK CIRCUIT SIGNALING SYSTEM

Original Filed Aug. 19, 1942 11 Sheets-Sheet 3

INVENTOR
Neil D. Preston

CODED TRACK CIRCUIT SIGNALING SYSTEM

Original Filed Aug. 19, 1942 11 Sheets-Sheet 4

CODED TRACK CIRCUIT SIGNALING SYSTEM
Original Filed Aug. 19, 1942 11 Sheets-Sheet 5
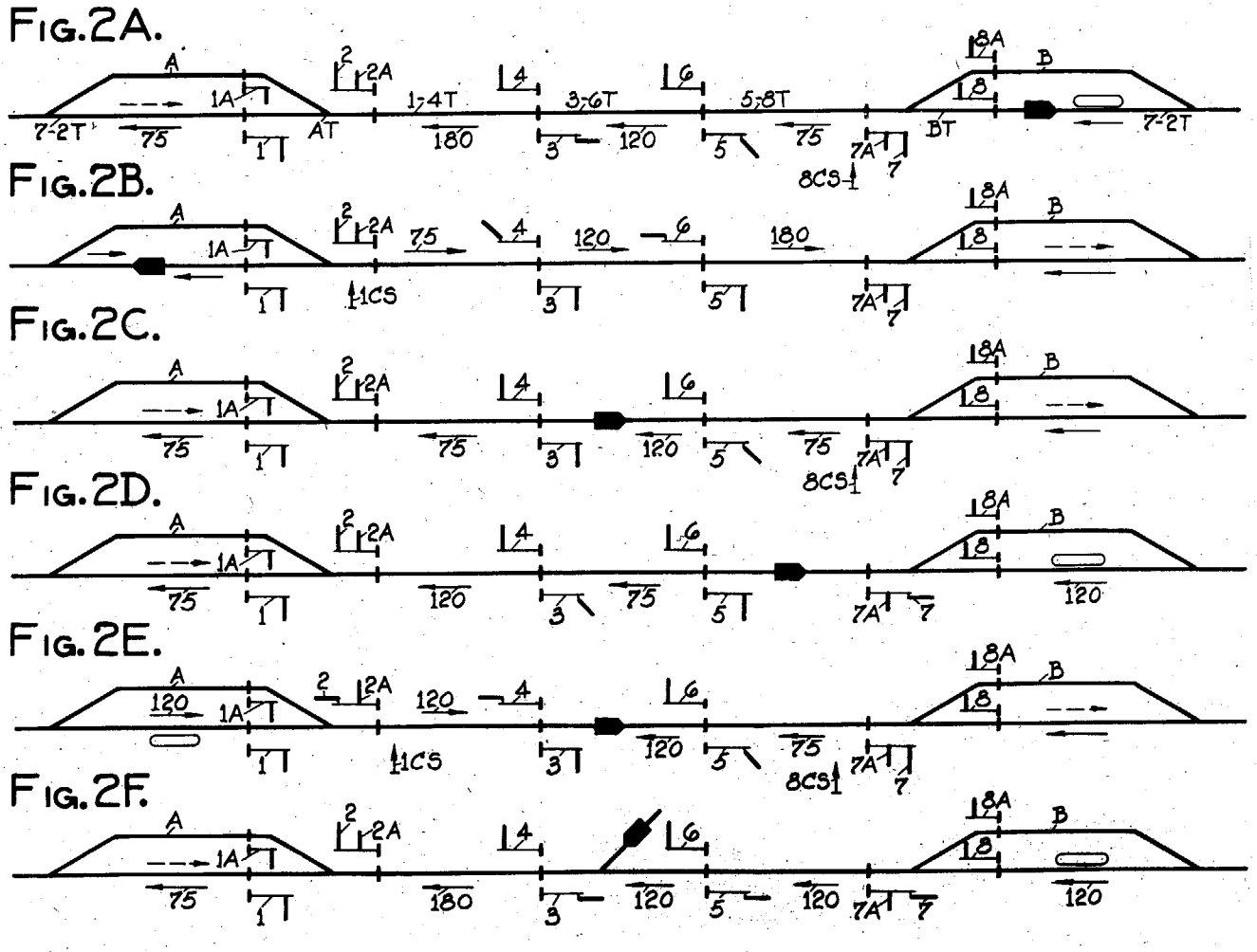
INVENTOR
Neil D. Preston

CODED TRACK CIRCUIT SIGNALING SYSTEM

Original Filed Aug. 19, 1942 11 Sheets-Sheet 6

INVENTOR
Neil D. Preston

CODED TRACK CIRCUIT SIGNALING SYSTEM

Original Filed Aug. 19, 1942 11 Sheets-Sheet 7

INVENTOR
Neil D. Preston

CODED TRACK CIRCUIT SIGNALING SYSTEM

Original Filed Aug. 19, 1942 11 Sheets-Sheet 8

CODED TRACK CIRCUIT SIGNALING SYSTEM

Original Filed Aug. 19, 1942 11 Sheets-Sheet 9

CODED TRACK CIRCUIT SIGNALING SYSTEM

Original Filed Aug. 19, 1942 11 Sheets-Sheet 10

INVENTOR
Neil D. Preston

CODED TRACK CIRCUIT SIGNALING SYSTEM

Original Filed Aug. 19, 1942 11 Sheets-Sheet 11

Reissued Nov. 25, 1947

Re. 22,939

UNITED STATES PATENT OFFICE 22,939

CODED TRACK CIRCUIT SIGNALING SYSTEM

Neil D. Preston, Rochester, N. Y., assignor to General Railway Signal Company, Rochester, N. Y.

Original No. 2,342,489, dated February 22, 1944, Serial No. 455,328, August 19, 1942. Application for reissue April 2, 1947, Serial No. 738,767

53 Claims. (Cl. 246—3)

Figure 1A:
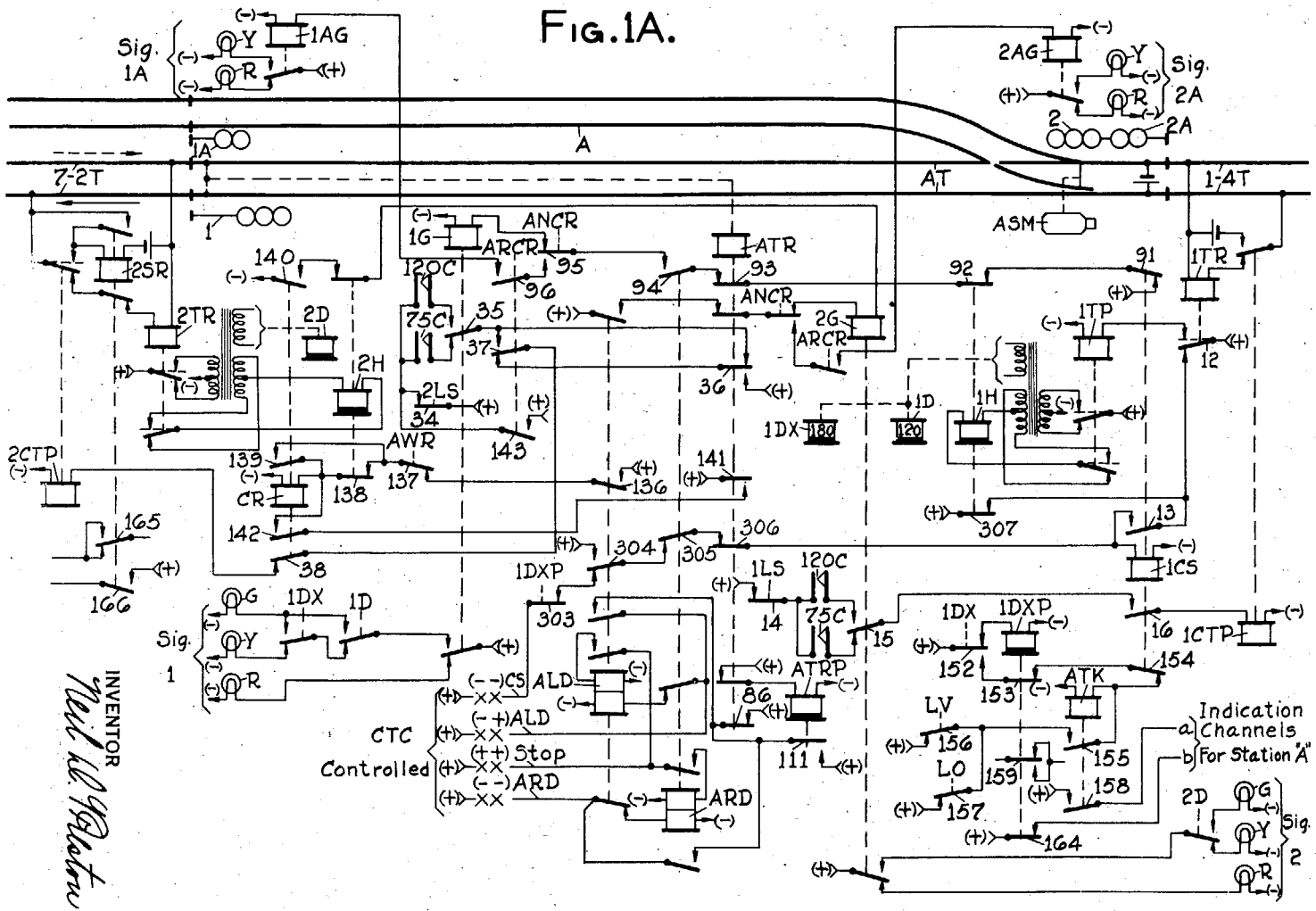

This invention relates to coded track circuit signaling systems for railroads, and more particularly to a centralized traffic control (C. T. C.) system for single track railroads.

In connection with the application of the conventional coded track circuit to single track railroads or like stretches of track having signals governing train movement in both directions, the direction in which the coded pulses are transmitted over the track rails of various track circuits for governing the indications of the associated signals has to be selected or governed to conform with the direction of train movement desired; and one method of determining the desired direction of track circuit coding, as disclosed, for example, in my prior application, Ser. No. 439,520, filed April 18, 1942, now Patent No. 2,357,546 dated Sept. 5, 1944, is by the supervisory manual control of the C. T. C. system used for controlling the clearing of the signals and also if desired for governing the power operation of track switches. In certain respects the present invention is in the nature of a variation or modification of this prior disclosure; and it is not intended to make any claim herein to subject matter disclosed in said prior application.

The primary object of the present invention may be said to be the provision of a simple organization of coded track circuits in combination with a C. T. C. system, preferably of the code type, which will afford all the desired safety and facility for train movement on single track railroads, or for like stretches of track having traffic in both directions, the essential functions being performed without the use of line wires except as may be required for the transmission of controls and indications between a control office and various field locations over the C. T. C. system.

Generally speaking, and without attempting to define the nature and scope of this invention, and considering one embodiment of the invention in its application to a typical single track railroad having passing sidings, it is proposed to employ the same manual controls of the C. T. C. system which are used to control the clearing of the signals governing train movement into and out of the stretches of single track for determining the direction of coding in the several track sections, leaving the coding of these track sections in the direction corresponding with the last train movement, and providing for the automatic reversal of such existing direction of track circuit coding whenever desired for opposing train movements by merely initiating coding operation of the track circuits in the opposite direction to overpower and discontinue coding in the existing direction. For example, after a train has travelled through a stretch of single track between the ends of passing sidings in one direction, and has left the track circuits of the stretch coding in a direction for following train movements, a manual control for clearing the opposing starting or head-block signal, when exercised over the C. T. C. system, also acts to initiate track circuit coding at the opposite end of the stretch, which overcomes or bucks down, so to speak, the track circuit coding in the existing direction in the track circuits of the stretch in turn, thereby causing clearing of the head-block signal and intermediate signals for the new desired direction of train movement.

Considering more specifically the means employed, there is a code sending means for each end of the stretch of a single track between the ends of passing sidings which once set into operation continues in operation until restored by code pulses received over the track rails from the opposite end; and when a manual control is exercised over the C. T. C. system to clear the head-block signal at one end of the stretch, operation of the code sending means for the opposite end of the stretch is also initiated, thereby applying driven code pulses to the track rails at that opposite end which act to overcome any existing coding of the track circuits in a conflicting direction and thus cause clearing of the head-block signal and associated intermediate signals as required for the desired direction of train movement.

Among other things, this method of determining the direction of track circuit coding by overpowering any existing track circuit code in a conflicting direction, in the manner characterizing this invention, permits manual control of the clearing of an intermediate signal in a stretch of single track when desired to allow a train in this stretch to make a back-up move with safety, the coding of the track circuits in this instance being set up by the manual control for clearing the corresponding entering signal governing train movement out of the stretch at the end to which back-up movement is to be made. Similarly, in the case of an outlying switch in the single track stretch, the desired intermediate signals may be cleared under supervisory manual control to enable a train to move from this switch towards either end of the stretch, the coding of the track circuits in this case also being set up by a manual control to clear the corresponding entering signal.

For reasons relating to the use of the code type C. T. C. system for governing the direction of track circuit coding and more conveniently discussed later, it is proposed in accordance with this invention to determine by manual supervisory control in a different manner the direction of track circuit coding for the siding sections constituting the stretches of main track opposite the passing sidings. Generally speaking, when a manual control to clear the entering signal at either selected end of a siding section is exercised over the C. T. C. system, the desired direction of coding in this section is set up by acting upon the coded track circuit equipment at the same end of the siding section, rather than at the opposite end as in the case of the stretch of single track between the ends of passing sidings. In the particular arrangement shown, the track circuit of the siding section is normally left coding in a predetermined prevailing direction to which it is automatically reset after each train movement, and coding in a direction opposite to this prevailing direction is established when desired in response to a manual control to clear an entering signal by stopping such coding in the prevailing direction at the transmitting end, provided the coding in the prevailing direction is not being used to clear the other entering signal and inverse or off code pulses are being received at said transmitting end.

Another feature of the invention relates to indicating automatically in the remote control office of the C. T. C. system the occupied or unoccupied condition of the siding sections and the single track stretches between the ends of the passing sidings. In the case of the siding sections, a series or approach relay responsive to a wheel shunt is employed for governing the operation of the C. T. C. system to transmit an occupancy indication to the control office. In the case of the single track stretches, an indication control relay at each end of the stretch is arranged to be energized whenever the stretch becomes occupied by a train to cause transmission of an occupancy indication to the control office, and this relay is maintained energized until the stretch becomes unoccupied.

In another embodiment of the invention constituting a modification or variation, instead of leaving the system normally coding after each train movement to transmit code pulses suitable for clearing signals for one direction of train movement, provision is made to automatically stop or shut down the track circuit coding after each train movement, when such coding is no longer needed for signal clearing purposes, this shut-down function being performed by transmitting a single shut-down pulse of limited duration, in opposition to the direction of coding left behind a train, and thereby release the code sending relay then energized to cause the system to assume a normally deenergized and inactive condition. When it is required to clear some signal for a desired train movement after the system has thus been shut down, provision is made for automatically initiating track circuit coding in the proper direction in response to the supervisory manual control of the C. T. C. system to clear such signal. In the case of the single track stretches between the ends of passing sidings, coding operation is initiated after the system has been shut down at either selected end of the stretch when a signal clearing control is exercised by the C. T. C. system for the opposite end of the stretch; but in the case of the siding sections opposite the passing sidings, track circuit coding in the required direction is automatically initiated after the system has been shut down by transmitting a start pulse over the track rails from the end of the siding section at which a signal clearing control is exercised by the C. T. C. system.

Since the track circuits and associated coding equipment are not energized or operating in this other embodiment of the invention, except while signals are being cleared for some desired train movement, it is apparent that a substantial saving in current consumption and in the wear on the contacts and other moving parts of the coding equipment is obtained. This normally inactive or shut-down equipment of the invention provides for back-up train moves under supervisory manual control, for train movements into and out of outlying track switches, and for the transmission of indications of occupancy of the different portions of track to the control office, and otherwise affords the same facility and safety of train movement as in the normally coding form of the invention.

Various other characteristic features, attributes and advantages of the invention will be pointed out in detail hereinafter and will also be apparent as the description progresses.

The accompanying drawings illustrate certain specific embodiments of the invention in a simplified and diagrammatic manner, and are arranged to facilitate an explanation and understanding of the nature and mode of operation of the system rather than show in detail the construction and arrangements preferably employed in practice.

Figure 3:
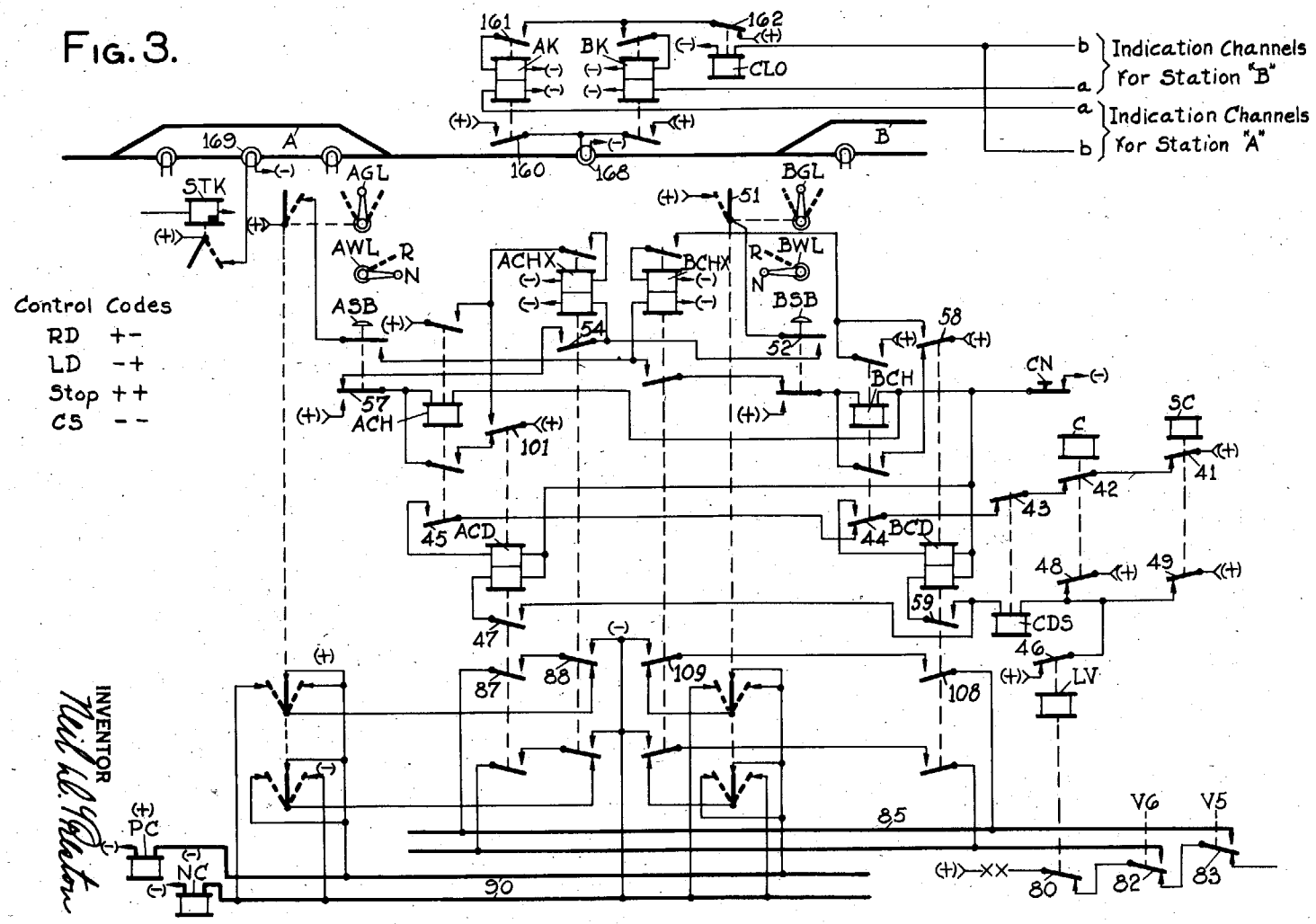
Figure 4:
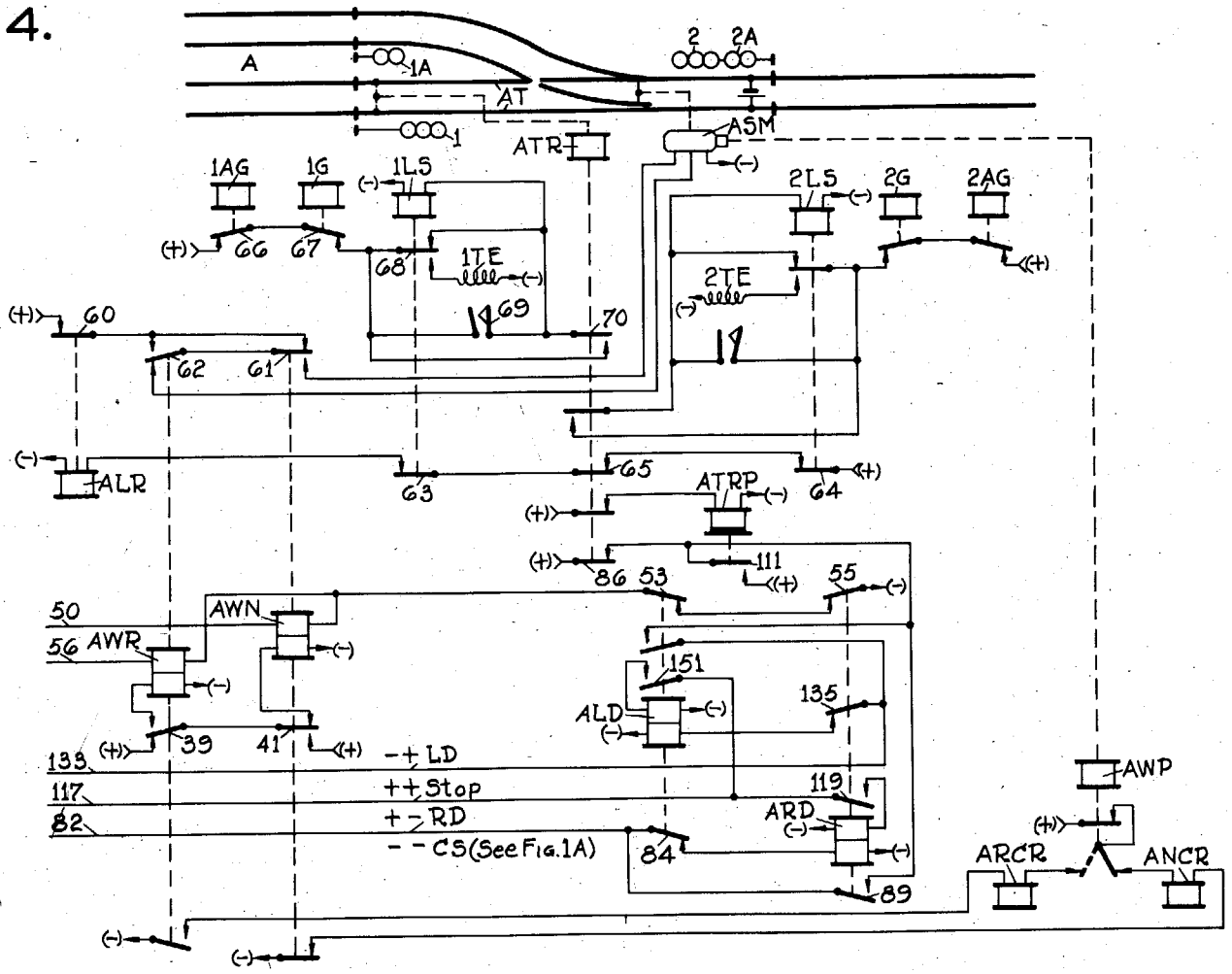

In describing the invention, reference will be made to the accompanying drawings in which those parts having similar features and functions are designated throughout the several illustrations by like letter reference characters which are generally made distinctive by reason of preceding numerals indicative of the location of the signal with which such parts are associated, and in which:

Figs. 1A, 1B, 1C and 1D, when arranged end to end, illustrate the system of this invention as applied to a typical stretch of single track between the ends of passing sidings and also one siding section;

Figs. 2A to 2F comprise a series of explanatory diagrams illustrating various operating characteristics of the embodiment of the invention shown in Figs. 1A to 1D;

Fig. 3 illustrates conventionally and diagrammatically the control panel and certain features of control equipment for a particular type of coded C. T. C. system suitable for governing the signals and the direction of track circuit coding for the embodiment of the invention shown in Fig. 1;

Fig. 4 shows diagrammatically a typical arrangement for the control of a power operated track switch together with the time release stick locking associated with such switch; and Figs. 5A, 5B, 5C and 5D, when placed end to end, illustrate a modification of the system of the present invention and embodying the shut-down feature mentioned above.

In these drawings relays and contacts have been shown in a conventional manner, and to facilitate the illustration in some instances the contacts of relays are illustrated at a different place on the drawings than the winding of the relay. Also, to simplify the illustration of circuits, connections with the opposite terminals of a battery or other suitable source of current for energizing local circuits have been represented by the symbols (+) and (—) associated with arrows.

*General organization.*—For the specific embodiments of the invention illustrated, it is assumed that the invention is applied to a typical or conventional single track railroad comprising single track stretches between the ends of passing sidings and siding sections constituting the portions of the main track opposite the passing sidings. It is also assumed that the switches at the ends of the passing sidings will be power operated in the usual manner by switch machines under the supervisory manual control of the C. T. C. system, although it should be understood that the system may be used in connection with hand operated switches.

Figs. 1A to 1D inclusive, when arranged end to end, show the apparatus and circuits for a single track stretch between the siding ends A and B, with starting or head-block signals 1 and 1A, governing east-bound train movement into the stretch; starting signals 8 and 8A governing west-bound train movement into the stretch; entering signals 2 and 2A govern west-bound train movements while entering signals 7 and 7A govern east-bound train movement out of the stretch over their respective switches in normal or reverse positions; and two pairs of opposite intermediate signals 3, 4, and 5, 6. At each siding end is a detector track circuit AT and BT, which is of the usual normally and steadily energized type. It should be understood that the arrangement and location of signals illustrated is merely typical and that the invention may be applied to other arrangements.

Figure 1B:
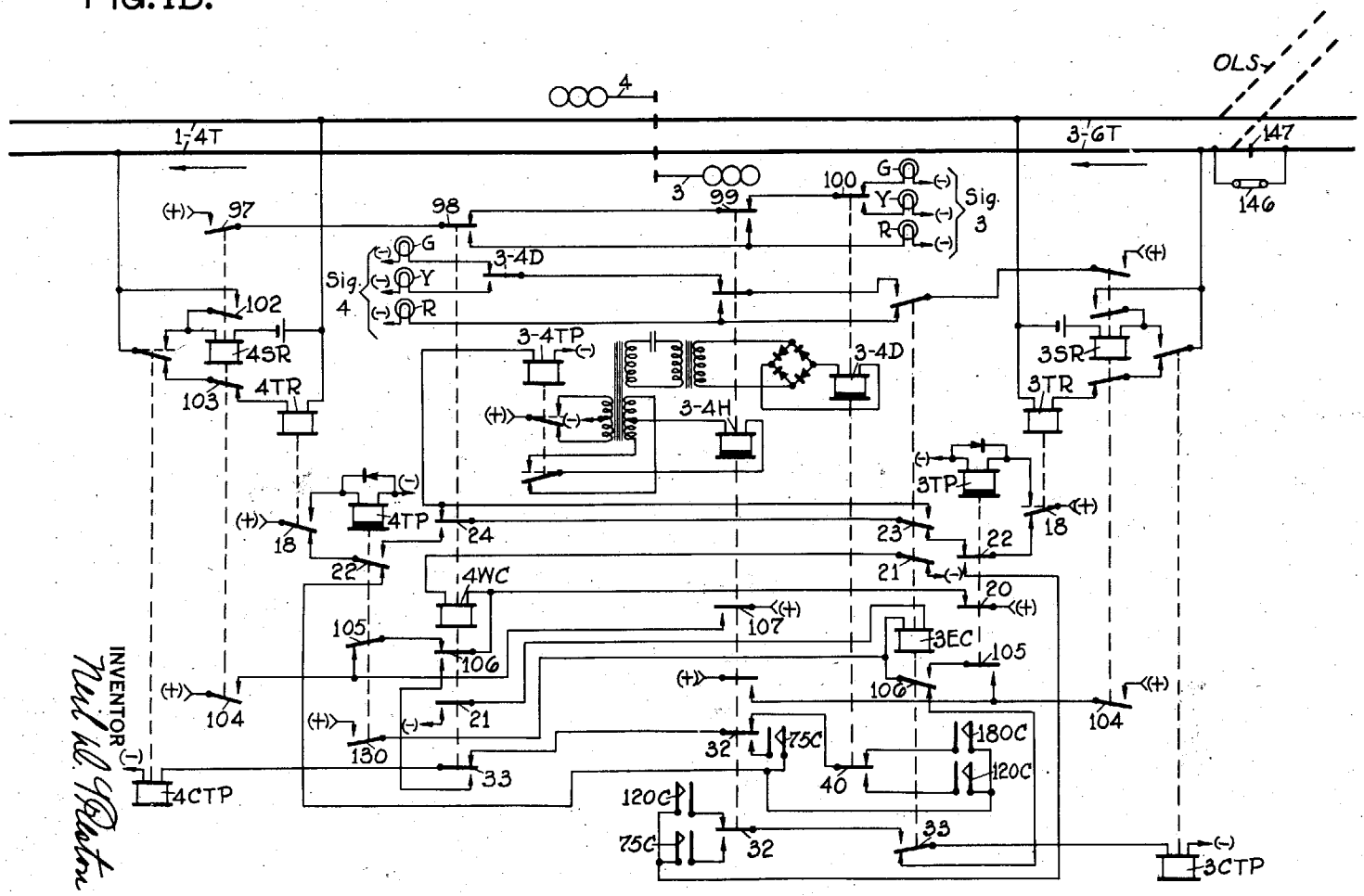
Figure 1C:
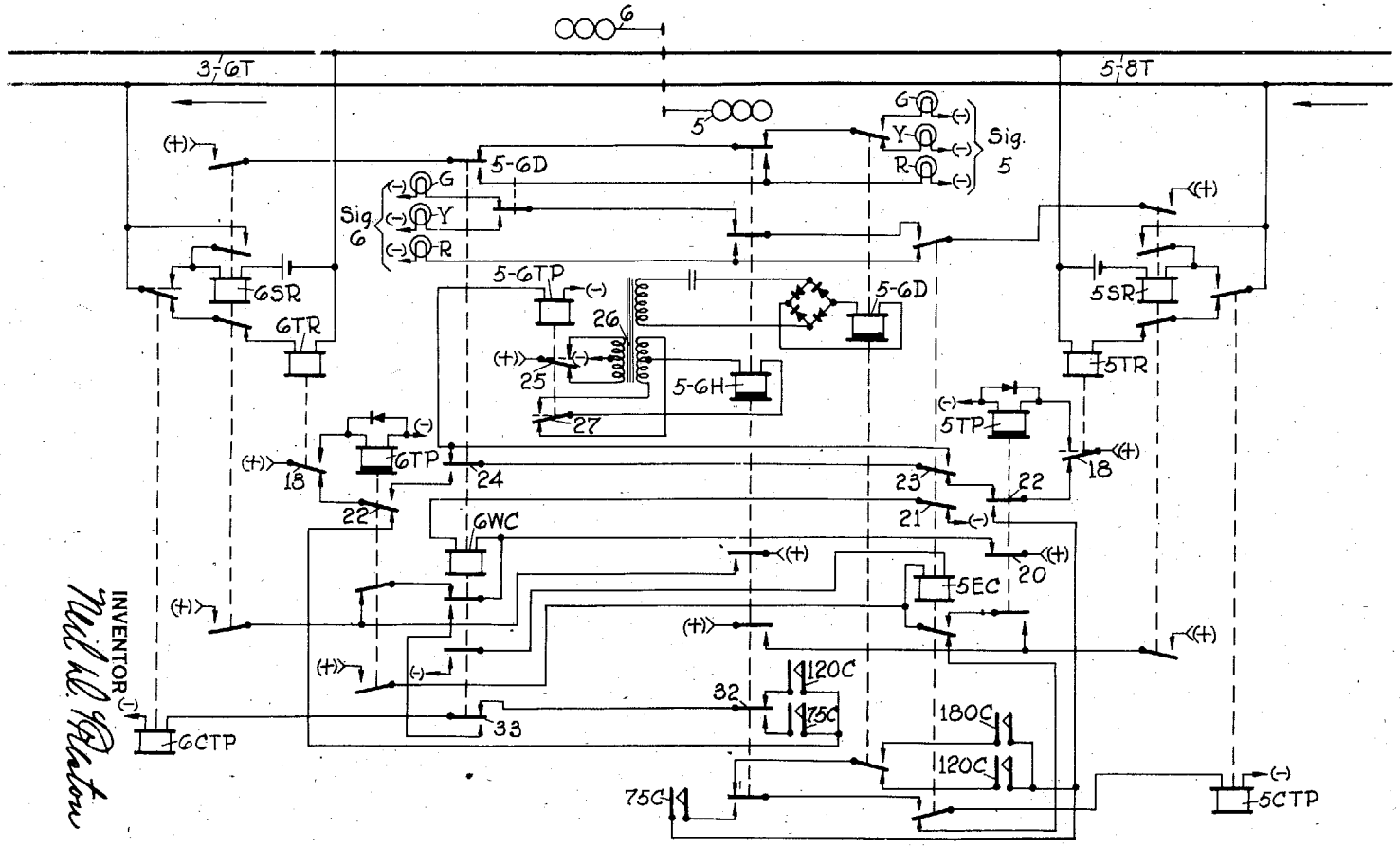
Figure 1D:
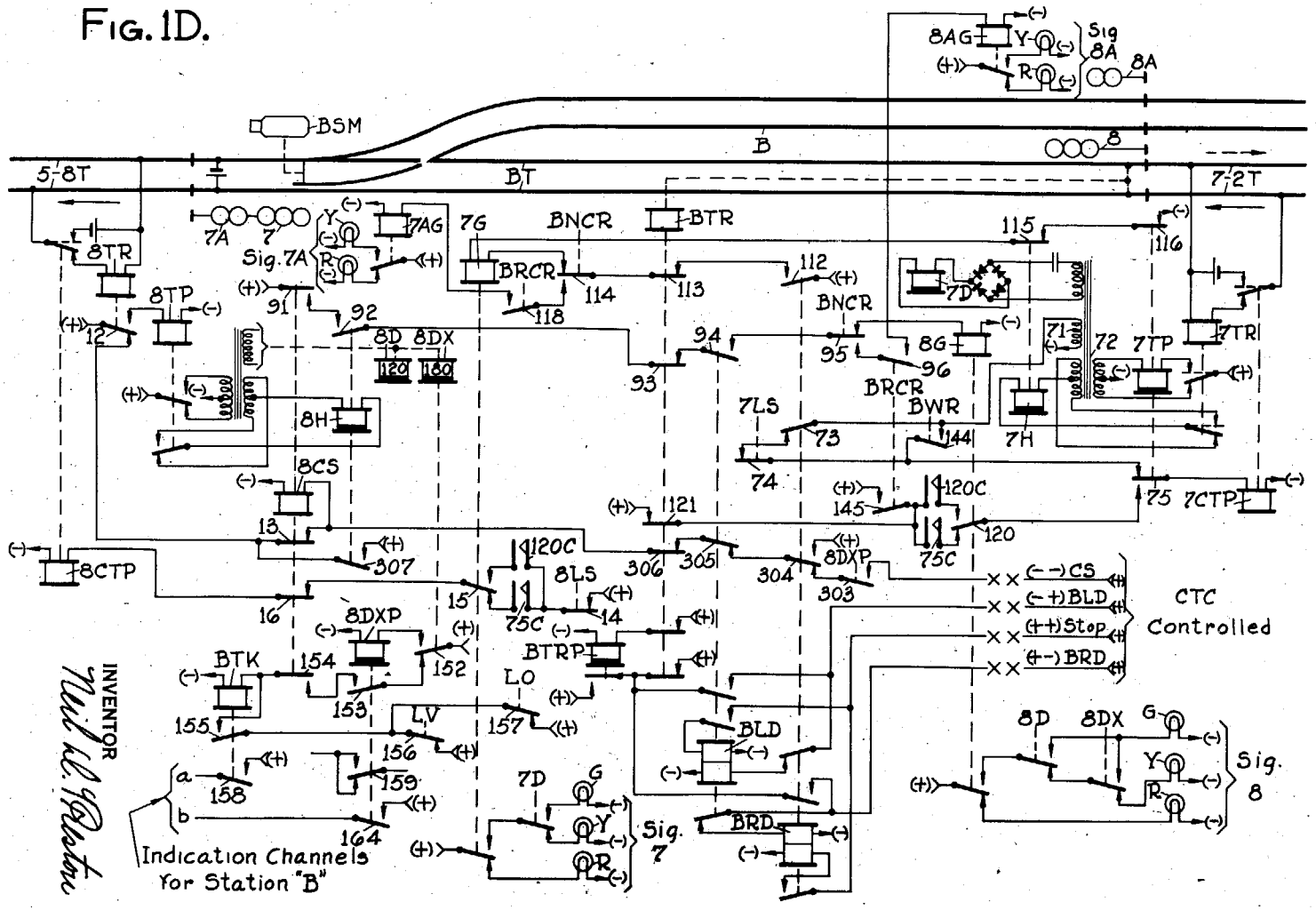

In the conventional arrangement of tracks for single track railroads as assumed, a siding section or portion of main track is associated with each passing siding; and while the two ends of such siding sections shown in Figs. 1A and 1D are physically different portions of track, it is convenient to assume, in order to avoid unnecessary duplication of drawings, that the relays and circuits shown in these Figs. 1A and 1B belong to the opposite ends of the same siding section designated 1—2T, so that the circuit organization for one complete siding section is shown when Figs. 1D and 1A are arranged end to end.

These signals may be of any suitable type, but for simplicity in the illustration of their control circuits are assumed to be color light signals which display green, yellow, and red lights for proceed, caution, and stop indications when the lamps G, Y, and R are lighted by the circuits shown. Color light signals of the so-called search light type, such as disclosed, for example, in the patent to Field, No. 2,097,785, dated November 2, 1937, may be controlled from the same home and distant relays H and D shown in the manner disclosed in my prior application, Ser. No. 439,520, filed April 13, 1941.

The starting of head-block signals 1, 1A and 8, 8A and also the entering signals 2, 2A, and 7, 7A, if power operated switches are used, are arranged to display in accordance with established practice absolute stop-and-stay indications, while the intermediate signals 3, 4, 5, and 6 are arranged to display permissive stop indications, such as by the vertical or staggered relation of the signal light with a marker light. In the embodiment of the invention shown, arrangement is made for approach lighting and intermediate signals in a manner later explained;

and if desired the same expedient may be employed for approach lighting the entering signals such as 2, 2A and the high speed starting signals such as 1. The side track or portions thereof may also be equipped, if desired, with track circuits to provide approach lighting for the low speed signals 1A and 8A governing train movement off of the siding.

The C. T. C. system required for the control of the signals and direction of track circuit coding may be of any suitable form capable of governing the energization of signal clearing relays at the siding ends, and also controlling the power operation of the associated switch machines ASM and BSM, if used. It has been assumed that the C. T. C. system will be of the code type acting to transmit during a control cycle a series of distinctive code elements for station selection and switch and signal control. This system also operates during an indication cycle to send to the control office a series of distinctive code elements identifying the particular field station sending, and also constituting indications of switch position, signal clearing, and track occupancy. As a tangible example of a code C. T. C. system of this character, it has been assumed that the apparatus and circuits as illustrated will be controlled by a two-wire code C. T. C. system such as disclosed in the patent to Hailes et al., Patent No. 2,259,561, granted October 21, 1941, and also illustrated and described in Centralized Traffic Control Handbook 20 of the General Railway Signal Company, copyrighted 1941.

It is contemplated that the control office equipment of the C. T. C. system will include the usual control machine having on its control panel a miniature track diagram of the railroad, as diagrammatically illustrated in Fig. 3 with the usual two-position switch levers such as AWL and BWL for the switches at each end of the passing sidings; three-position signal levers such as AGL and BGL governing the signals associated with each siding end, together with suitable start buttons ASB and BSB associated with each lever group or panel. Indications of the switch operation may be displayed by a correspondence lamp in the switch lever as disclosed in my prior Patent No. 2,038,128, dated April 21, 1936, or in any other suitable manner. Indications of the clear or stop condition of the signals may be displayed by lamps located in the signal levers or otherwise associated therewith or by lighting lamps in miniature representations of the signals on the track diagram as disclosed for example in the patent to Phinney, No. 2,215,407, dated September 17, 1940. In addition to the usual track occupancy lamps associated with the detector track sections, it is proposed in accordance with this invention to provide a lamp for each siding section and each single track stretch to indicate occupancy of these respective portions of the track when lighted. Fig. 3 also illustrates diagrammatically a special arrangement of change and code determining relays governed by the start buttons which provides the desired transmission of control codes to different field stations for the purposes of this invention, as explained hereinafter.

Each of the siding sections and each block between the signals is provided with a coded track circuit equipment similar to and involving the same operating principles as the conventional and well-known coded track circuit. Each of these coded track circuits comprises a source of current (assumed to be a battery), a code following track relay TR, and a transmitter relay CTP for each end of the track section. The code transmitter relay CTP is arranged to be operatively connected to coding contacts C of a suitable code oscillator or equivalent which are intermittently operated in the usual way at a predetermined code rate; and when the transmitter relay is thus energized and deenergized it connects the source of current and the track relay respectively across the track rails alternately at a rate determined by the oscillator contacts with which the transmitter relay is then connected. Each track relay TR directly, or by the operation of a repeater relay, governs the energization of a decoding transformer in the usual way to cause energization of a signal control home relay H in response to the coding operation of the track relay at any rate for giving a caution indication, and causing energization of a signal control distant relay D in response to coding operation of the track relay at a predetermined proceed or clear code rate, all in the manner that will be readily apparent to those skilled in the art. It is assumed that code pulses at the rate of 75 per minute will be employed for caution signal control, and at the rate of 120 for clear signal control, an extra clear code rate of 180 being also preferable employed in connection with the end track sections of the stretch for purposes later explained. These 75, 120 and 180 code rates are determined by oscillator or coding contacts 75C, 120C and 180C respectively.

In one arrangement of control circuits for the intermediate signals, as shown in Figs. 1B and 1C, there is only one H relay and one D relay for each pair of intermediate signals; and these relays H and D govern the indications of one or the other of these signals selected in accordance with the energization of coding direction relays WC and EC, which also perform the functions of directional stick relays for these signals.

The power operation of the switch and the clearing of the signals at each siding end in response to supervisory manual control may be governed in any suitable manner by the C. T. C. system; and one typical arrangement suitable for this purpose, based upon the disclosure of the patent to Wells, Patent No. 2,159,922, May 23, 1939, is illustrated in Fig. 4 for the siding end A. Referring to this Fig. 4, the signal clearing relays ARD and ALD for governing the clearing of signals 1, 1A and 2, 2A for train movement to the right and left respectively, and the switch control relays AWN or AWR controlling the power operation of the switch to the normal and reverse position respectively, are governed by the code C. T. C. system in the manner fully explained in the Wells patent above mentioned, and for the purpose of understanding the present invention a brief summary of this operation will be sufficient.

When the signal lever AGL in Fig. 3 is operated to the right or to the left and a control code is transmitted, the lower winding of the corresponding signal clearing relay ARD or ALD is energized for train movement in a corresponding direction to the right or to the left; and when a control code is transmitted with the signal lever ALG in the midde or stop position, the relay ARD or ALD then energized is manually restored to the deenergized position by the neutralization or differential action effected by energizing its upper winding.

Each signal clearing relay ARD and ALD has a stick circuit through its lower winding governed by a front contact 86 of the detector track relay ATR and a back contact 111 of its slow repeater relay ATRP, so that the relay ARD or ALD then energized is automatically restored to its deenergized condition by the entrance of a train into the detector track section to drop the detector track relay ATR, and also so that either of these relays, if energized by C. T. C. control while the detector track section is occupied, will be held up after the train leaves, all in a manner more fully explained in the Wells patent above mentioned.

The switch control relays AWN and AWR are selectively energized by the C. T. C. code system in accordance with the operated position of the switch lever AWL of Fig. 3, each of these relays being maintained energized by a stick circuit until the other is energized by manual control. Also, the circuits for energizing the upper windings of the relay AWN or AWR by C. T. C. control include back contacts 53 and 55 of the signal clearing relays ARD and ALD, so that no C. T. C. control to change the position of the switch is effective while a signal clearing control is exercised. These switch control relays AWN and AWR control by their contacts 61 and 62 the application of operating current to an electrically operated switch machine ASM of the usual type to cause power operation of the switch to the corresponding normal or reverse position, provided such operation is safe and a lock relay ALR is energized to close its front contact 60.

When the position of the switch, as manifested by the condition of a relay AWP governed in the usual way in accordance with the position and locked condition of the switch, matches the existing control exercised by the switch control relay AWN or AWR then energized, a corresponding normal or reverse correspondence relay ANCR or ARCR is energized by circuits easily traced on the drawing; and these correspondence relays ANCR and ARCA govern the clearing of the associated signals in the usual manner as illustrated in Fig. 1A.

While special provisions may be made for approach locking control of the switch, such as by providing inverse codes in the manner disclosed for example in my prior application, Ser. No. 439,520, filed April 18, 1942, above mentioned, in the interests of simplicity, it has been assumed in the disclosure of the present invention that time release stick locking will be employed, and one typical arrangement for this purpose is diagrammatically shown in Fig. 4. Referring to Fig. 4, the power circuits for the switch machine ASM, governed by the switch control relays AWN and AWR, are opened at the front contact 60 of a lock relay ALR when this relay is deenergized by opening its normally closed circuit upon opening contacts 63 and 64 by the release of either of the lock stick relays 1LS or 2LS for the signals 1, 1A, and 2, 2A governing train movement over the switch, or upon opening of contact 65 by the release of the detector track relay ATR. This energizing circuit for the lock relay ALR may be readily traced on the drawings.

The lock stick relays 1LS and 2LS and their associated time element devices 1TE and 2TE, together with back contacts of the detector track relay, provide stick locking with time release and detector track circuit release in the well known manner. For example, when either signal relay 1G or 1AG is energized to clear the associated signal, the stick circuit for the relay 1LS readily traced on the drawings through contacts 66, 67 and 68 is broken; and when the signal is manually put to stop, current is supplied through the back contact 68 of this relay 1LS to its time element device 1TE to close its contacts 69 after a prescribed time interval to allow re-energization of the relay 1LS. When the signal is put to stop by a train entering the detector track section, the back contact 70 of the detector track relay ATR allows the lock stick relay 1LS to be re-energized immediately.

Although the circuits and apparatus of Fig. 4 have been described as associated with the siding end A, it is to be clearly understood that similar circuits and apparatus are assumed to be associated with siding end B, and all others of a complete system. Also, all operations mentioned in connection with this Fig. 4 are to be considered typical of all other siding ends.

*Normal conditions.*—In the embodiment of the invention illustrated in Figs. 1A to 1D, driven code pulses are transmitted under normal conditions over the track rails of the track sections of the single track stretch in a direction dependent upon the direction of the last train movement through the stretch, as shown in the diagrams of Figs. 2A and 2B; but for the showing in Figs. 1A to 1D it has been assumed that the last train movement through the stretch was east-bound leaving the track sections coding in a west-bound direction as indicated by the solid arrows in said Figs. 1A to 1D as well as in the diagram of Fig. 2A. Under normal conditions, driven code pulses are transmitted over the track rails of the siding section in a predetermined prevailing direction assumed to be west-bound as shown in the diagram of Figs. 2A and 2B and indicated by the solid arrows in Figs. 1A and 1D; and there are also inverse or off-code pulses in the track rails of this siding section in the opposite direction as indicated by the dotted arrows in those figures.

In many respects the arrangement of relays and operating circuits are the same for the siding ends and intermediate signal locations; and it is convenient and helpful to assign the same reference numbers to corresponding contacts for the different relays without differentiating between the locations where these contacts are used. Also, in connection with the use of reference numbers on the drawings, for the purpose of convenient reference, a number of the wires and contacts in Fig. 3 corresponding with those disclosed in the Hailes et al. Patent No. 2,259,561, October 21, 1941, are given the same reference numbers used in this patent; and the same is true for various parts shown in Fig. 4 corresponding with those disclosed in the Wells Patent No. 2,159,922, May 23, 1939.

The direction of coding in the single track stretch under the normal conditions assumed, is due to the fact that the code sending stick relay 8CS in Fig. 1D, which was energized by manual control exercised by the C. T. C. system (in a manner later discussed) at the time the signals were cleared for the prior eastbound train movement assumed, it being maintained energized by a stick circuit closed through the back contact 12 of the code following track relay 8TR, and front contact 13 of relay 8CS. With the code sending relay 8CS thus maintained energized, the transmitter relay 8CTP is intermittently energized at the 75 code rate by a circuit which may be traced from (+) through front contact 14 of the lock stick relay 8LS associated with signals 8 and 8A, coding contacts of an oscillator 75C operating at the 75 code rate, back contact 15 of signal relay 7G, front contact 16 of relay 8CS through winding of transmitter relay 8CTP, to (—).

This application of driven code pulses at the east end of the end track section 5—8T causes coding operation of the code following track relay 5TR at the other end (see Fig. 1C), which intermittently energizes through its front contact 13 a front contact repeater relay 5TP. The track repeater relay 5TP is made sufficiently slow releasing, while relatively quick to pick up in any suitable manner as by being shunted by a rectifier, so as to hold its front contacts closed during the coding operation of the track relay 5TR.

With the track relay repeater 5TP energized, the coding direction relay 6WC is energized by a pick-up circuit which may be traced from (+), through front contact 20 of relay 5TP, relay 6WC, back contact 21 of other coding direction relay 5EC, to (—). Under these conditions, a quick acting track repeater relay 5—6TP is energized each time the track relay 5TR drops over a circuit closed from (+), through back contact 18 of track relay 5TR, front contact 22 of relay 5TP, back contact 23 of relay 5EC, and front contact 24 of relay 6WC, windings of relay 5—6TP, to (—). The intermittent operation of the contact finger 25 of the repeater relay 5—6TP energizes alternately the two halves of the primary of the decoding transformer 26, and causes intermittent energization of the home relay 5—6H by impulses in the secondary of this transformer rectified by front and back contacts of contact finger 27 of the repeater relay 5—6TP in a manner familiar to those skilled in the art. The home relay 5—6H has the usual slow release characteristics so as to maintain its armature steadily in the attracted position during the coding operation of the repeater relay 5—6TP.

With the relays 6WC and 5—6H energized, the transmitter relay 6CTP for the track section 3—6T is connected to coding contacts operating at the 120 rate through a circuit which may be traced from (+), through back contact 18 of track relay 6TR, back contact 22 of its slow release front contact repeater 6TP, coding contacts 120C, front contact 32 of relay 5—6H, and front contact 33 of relay 6WC, winding of code transmitting relay 6CTP, to (—).

These driven code pulses applied to the east or righthand end of the track section 3—6T cause coding operation of the code following track relay 3TR in Fig. 1B; and at the signal location 3 circuits similar to those described for signal location 5 result in the energization of the track relay repeater 3TP, intermittent operation of the track repeater relay 3—4TP, and energization of relays 4WC and 34H. Also, since the proceed 120 code rate is being supplied to this track section 3—6T, the relay 3—4D at signal 3 is also energized through the agency of its tuned decoding circuit and rectifier in the usual manner.

Under these conditions, with relays 4WC, 3—4H and 3—4D at the signal location 3 energized, the transmitter relay 4CTP for track section 1—4T is operated at the 180 code rate by a circuit similar to that described for signal location 5 and readily traced on the drawings through back contacts 18 and 22 of relays 4TR and 4TP, coding contacts 180C, front contact 40 of distant relay 3—4D, front contacts 32 and 33 of relays 3—4H and 4WC, relay 4CTP, to (—). This causes coding operation of the track relay 1TR in Fig. 1A and its quick acting repeater 1TP at the siding end A; thereby energizing relay 1H, and also relay 1DX responsive to the 180 code rate.

Considering now the normal condition of coding in the siding section, and referring to Figs. 1D and 7A arranged end to end to show the complete siding, transmitter relay 2CTP at the east or right-hand end of the siding section 7—2T is connected to the coding contacts operating at the 75 code rate by a circuit which may be traced from (+), through a front contact 34 of the lock stick relay 2LS for signals 2 and 2A, coding contacts 15C, back contact 35 of signal relay 1G, front contact 36 of detector track relay ATR, back contact 37 of the correspondence relay ARCR, back contact 38 of a code reversing relay CR, relay 2CTP, to (—).

This transmission of driven code pulses west for the prevailing direction assumed over the track rails of the siding track section 7—2T causes coding operation of the track relay 7TR and energization of its slow release front contact repeater relay 7TP, which in this instance is connected in series with the upper half of the decoding transformer. Likewise, signal control relay 7H is energized, but not the relay 7D, since the 75 caution code rate is being transmitted.

Provision is also made for transmitting over the track rails of the siding section inverse or off code pulses for the purpose of providing an interlock between the opposing entering signals 7 and 2 as later explained. In the arrangement shown, these inverse code pulses are created by an impulse secondary winding 71 on the decoding transformer 72 which acts each time on the track relay 7TR drops to provide a current impulse for momentarily energizing the transmitter relay 7CTP over a circuit which may be traced from (—), said impulse winding 71 through back contact 73 of the signal clearing relay BRD, front contact 74 of the lock stick relay 7LS, front contact 75 of repeater relay 7TP, transmitter relay 7CTP, to the same (—) terminal. The transmitter relay 7CTP is of a biased polarized type so that it is energized to operate its contacts only by an impulse of the particular polarity which exists when the track relay 7TR releases.

These inverse or off code pulses, which are transmitted in the usual way during the off intervals of the driven code in the siding track section, cause intermittent operation of the code following track relay 2TR (Fig. 1A) at the opposite end of the siding section from which the driven code pulses are being transmitted, and through the usual decoding transformer connection causes energization of the signal control relay 2H.

Under the normal conditions under discussion, the transmission of west-bound driven code pulses in the track sections of the single track stretch and the energization of the west code direction relays 4WC and 6WC (Figs. 1B and 1C) prepare circuits for causing the intermediate signals 3 and 5 to display green or clear and yellow or caution indications respectively as shown in the diagram of Fig. 2A; but these signals are preferably arranged as shown to be approach lighted, so that no indications for these intermediate signals are actually shown. The signals at the siding ends are also at stop under normal conditions, since the signal clearing relays ARD and BRD manually controlled by the C. T. C. system are deenergized, although driven codes are being transmitted in a direction to clear such signals for east-bound train movements.

*C. T. C. control of signal clearing and direction of track circuit coding.*—In accordance with this invention, when a supervisory manual control is exercised over the C. T. C. system to clear a head-block signal at a selected end of the single track stretch between passing sidings, a control is likewise exercised to initiate operation of a code sending means at the opposite end of this single track stretch. This plan of operation is characteristic of the system disclosed in my prior application, Ser. No. 439,520, filed April 18, 1942; and if desired the same organization disclosed in that application may be employed in connection with the present invention to control the energization of the signal clearing relay ARD or BLD at a selected end of the single track stretch and on the same operating cycle of the C. T. C. system cause energization of the code sending relay CS for the opposite end of the stretch. As a modification or variation of this method of C. T. C. control, the present disclosure employs a special arrangement of starting circuits in the control office, as illustrated in Fig. 3, so as to cause energization of a signal clearing relay ARD or BLD (Figs. 1A and 10) at the C. T. C. field station at one siding end during one operating cycle, and energization of the code sending relay CS at the C. T. C. field station at the other siding end during another operating cycle. In other words, in the arrangement disclosed, provision is made to cause the code C. T. C. system to operate through two operating cycles when the operator desires to send a train into the single track stretch, and to transmit to one field station on one operating cycle a signal clearing control, and to a different field station during the other operating cycle a code starting control.

Considering this proposed organization of a code C. T. C. system, it is an operating characteristic of this type of system that during each operating cycle for transmission of controls one particular field station is selected in accordance with the character of the code elements transmitted during a number of station selecting steps, corresponding with a particular group of levers manually actuated by the operator and requiring the transmission of new switch and/or signal controls.

In the particular type of code C. T. C. system disclosed in the patent to Hailes et al. No. 2,259,561, October 21, 1941, and selected as the basis for the present disclosure, the system is normally at rest and is set into operation by actuation of start buttons which control the energization of a group of change and code determining relays so as to transmit control cycles in a predetermined sequence for the levers having start buttons actuated. Also, in this particular system, the character of the control elements for transmission of distinctive controls is determined by the polarity of energization of the line circuit: and signal control codes for the energization and release of relays RD and LD for each field station are transmitted on two control steps, say (+—) for RD energization, (—+) for LD energization, and (++) for stop signal control, as explained fully in the patent to Wells, No. 2,159,922, May 23, 1939. This leaves the code combination of (——) on these signal control steps available for performing other functions; and in accordance with this invention it is proposed to use this extra control code (——) for the energization of the code sending stick relay CS associated with the corresponding field station.

The additions and variations of the code C. T. C. system disclosed in the patent to Hailes et al., No. 2,259,561, for accomplishing this purpose relate to the starting and code determining circuits to provide for starting and transmission of this extra control code (——) to the field station at one siding end when the start button for the field station at the other siding end is actuated at a time while its signal lever is positioned for train movement into the single track stretch. For this purpose, the starting and code determining relays and circuits in the control office shown in Fig. 2 of the Hailes Patent No. 2,259,561 are modified as illustrated in the accompanying Fig. 3, more particularly by the addition of auxiliary change relays such as ACHX for each field station group of levers.

Considering the operation of this control office equipment of Fig. 3 in the case of a west-bound train movement, when the operator actuates start button BSB, after positioning the signal lever BGL to the left, the change relay BCH for the siding end B is energized in the usual way and also the auxiliary change relay ACHX for the field station at the other siding end A is energized by a circuit from (+), through contact 51 of signal lever BGL to the left, contact 52 of start button BSB and lower winding of relay ACHX, to (—); and closing of the front contact 54 of relay ACHX also causes energization of the regular change relay ACH through the normally closed contact 57 of the start button ASB, winding of relay ACH, normally closed contact of the cancel button CN, to (—).

In this way, upon actuation of the start button BSB, when the signal lever BGL is set to the left, the change relay ACH for the field station associated with the other end of the single track stretch and its auxiliary change relay ACHX is also energized at the same time the regular change relay BCH is picked up. If the code C. T. C. system is at rest, or as soon as an existing operating cycle is completed, the code determining relay such as ACD is energized if its associated change relay such as ACH is energized, dependent upon the arrangement of these relays in the interlocking circuits. As illustrated, in accordance with the disclosure of the Hailes et al. patent, code determining relay BCD has a priority in the sequence of control code transmission over code determining relay ACD; but the operation under consideration would be substantially the same if the priority were different by a different arrangement of the interlocking circuits.

Referring to Fig. 3, and assuming the code C. T. C. system is at rest as shown, the energization of the change relay BCH by actuation of the start button BSB as just described, closes a circuit to energize the code determining relay BCD which may be traced from (+), through back contact 41 of relay SC, back contact 42 of relay C, back contact 43 of relay CDS, front contact 44 of relay BCH, upper winding of relay BCD, through the cancel button CN to (—). The energization of the relay BCD opens at its back contact 58 the stick circuit for the change relay BCH, and at the same time closes a front contact 59 to provide a stick circuit through the lower winding of relay BCD in series with the relay CDS. Thus, while the change relay BCH is deenergized, the relay CDS is energized to open its back contact 43 and prevent energization of any other code determining relay. This operation is described more in detail in the Hailes et al. patent above mentioned.

When the code determining relay BCD belonging to the field station of the C. T. C. code system at the siding end B of Fig. 1D is thus energized, the system operates in the manner explained in detail in the Hailes et al. patent to select this particular field station, and on certain control steps transmit (+) or (—) code elements to provide the desired controls for clearing signals or initiating operation of track circuit coding. In the simplified arrangement illustrated, it is assumed that steps 1, 2 and 3 of the operating cycle are allocated to station selection and step 4 to switch machine control, in conformity with the disclosure of the Hailes et al. patent above mentioned, and that steps 5 and 6 corresponding with the energization of step relays V5 and V6 are utilized for signal control.

Under the conditions assumed, with the code determining relay BCD energized and the signal lever BGL set to the left-hand position, a control code of (— +) will be transmitted on steps 5 and 6 to the field station at siding end B (Fig. 1D) to cause energization of the signal clearing relay BLD. Considering how this particular polarity of these code elements is determined, when the step relay V5 is energized, the relay NC giving a (—) code element is energized by a circuit which may be traced from (+), through back contact 80 of relay LV, back contact 82 of step relay V6, front contact 83 of step relay V5, code bus 85, front contact 108 of relay BCD, back contact 109 of relay BCHX, contacts of signal lever BGL to the left, to bus 90 and relay NC to (—). A similar circuit for energizing the relay PC giving a (+) code element is established on the sixth step when step relay V6 is energized.

Thus, under the particular conditions assumed, and with the arrangement of interlocking circuits for the code determining relays illustrated, the first operating cycle of the system causes transmission of a signal clearing control code of (— +) to the field station at siding end B.

When the relay LV in Fig. 3 is energized at the end of this operating cycle, the opening of its back contact 46, with the relays C and SC energized at this time to open their back contacts 48 and 49, interrupts the stick circuit for relay BCD in series with the relay CDS, thereby releasing relay BCD and closing at the back contact 43 of relay CDS the circuit for energizing code determining relay ACD through front contact 45 of relay ACH, when the operating cycle is completed and relay C and SC have released to close their back contacts 42 and 41.

The energization of the code determining relay ACD opens at its back contact 101 the stick circuit for the change relay ACH and at the same time establishes through its front contact 101 a supplemental stick circuit for the auxiliary change relay ACHX. The code C. T. C. system now operates in the regular manner as described in the Hailes et al. patent to select the field station at the other siding end A, and transmit on steps 5 and 6 a control code of (— —) for energization of the code sending relay ICS at this siding end A (see Fig. 1A). The circuit for energizing the relay NC on step 5 corresponding with a (—) code element may be traced from (+), through back contact 80 of relay LV, back contact 82 of step relay V6, front contact 83 of step relay V5, code bus 85, front contact 87 of relay ACD, front contact 88 of relay ACHX to bus 90, and relay NC to (—). A circuit for energizing the relay NC to give a (—) code element on the other step 6 when relay V6 is energized is similar to that just traced.

An operation of the C. T. C. system similar to that just described occurs when the signal lever AGL is set to the right and the start button ASB is actuated, the change relay BCH for the field station at the other siding end and its auxiliary change relay BCHX being energized by this start button, as well as its associated change relay ACH. In this case, due to the priority in the transmission of control codes to the field stations by the interlocking circuits as illustrated, the signal clearing control is transmitted on the second operating cycle of the C. T. C. system, and the control to initiate the track circuit coding on a prior operating cycle; but it can be appreciated that the order in which the signal clearing and code starting controls are transmitted is not material in the operation of the system, since the head-block signal being controlled cannot clear until a clearing track circuit code is received and also its signal clearing relay ARD or BLD is energized.

*Operation for an east-bound train movement.*—Having outlined the mode of operation with respect to the C. T. C. control for signal clearing and initiation of track circuit coding for the single track stretch between sidings, consideration may now be given to the operation of the system for typical train movements; and to illustrate certain operating characteristics of the invention it is expedient to assume that, under the normal operating conditions shown in the drawings, and with the track circuit coding existing in a direction for east-bound train movements, the operator desires to send another east-bound train from the siding end A of Fig. 1A to the siding end B of Fig. 1D, say from the side track at end A. To do this, the operator changes the position of the switch control lever AWL on the control panel in the control office (Fig. 3) if necessary to cause the track switch to assume the desired reverse position, sets the signal lever AGL to the right, and then actuates the start button ASB. This causes transmission of a control code to energize the signal clearing relay ARD in Fig. 1A in the manner above explained, and also sends to the other field station at the siding end B, a control code for energizing the code sending stick relay 8CS. Under the conditions assumed, however, the relay 8CS is already energized, so that such control code can perform no useful work, and relay 8CS remains energized over its stick circuit.

Thus, driven code pulses are transmitted over the track sections of the single track stretch toward siding end A. This results in the energization of the relays 1H and 1DX at siding end A (see Fig. 1A), so that either the head-block signal 1 or 1A may be cleared by manual control over the C. T. C. system.

Referring to Fig. 1A and considering the operation occurring at siding end A as a result of the energization of the signal clearing relay ARD, the closing of front contact 94 of this relay ARD closes the circuit to energize relay 1G or relay 1AG to clear signal 1 or 1A as the case may be, dependent upon the position of the switch. In the case assumed, the switch is supposed to be operated to the reverse position, and when this occurs relay 1AG is energized by a circuit which may be traced from (+), through back contact 91 of code sending relay 1CS, front contact 92 of signal control relay 1H, front contact 93 of detector track relay ATR, front contact 94 of relay ARD, back contact 95 of normal correspondence relay ANCR, front contact 96 of reverse correspondence relay ARCR, relay 1AG, to (—).

Signal 1A having thus been cleared, the train in question assumed to be on the siding may now advance into the detector track section AT. This releases the relay ARD by opening front contact 86 of the detector track relay ATR before the back contact 111 of its slow release repeater relay ATRP closes, to provide stick signal control. The opening of front contact 93 of the detector track relay ATR also acts to de-energize relay 1AG and put the signal 1A to stop. This does not interfere with the coding in the siding section, because under these conditions the reverse correspondence relay ARCR is energized, closing its front contact 37 to connect the oscillator coding contacts to the transmitter relay 2CTP independently of the position of the contact 36 of the detector track relay ATR.

When the east-bound train in question enters the first track section 1—4T of the stretch of single track, it shunts the track relay 1TR and stops its coding operation, thereby dropping relay 1H to open at its front contact 92 the energizing circuit for signal relay 1AG and maintain signal 1A at stop while this track section is occupied.

When the east-bound train in question enters the first track section 1—4T, or at least after it has advanced part way into this track section, depending upon operating conditions, the shunting effect of its wheels and axles increases the flow of current through the series relay 4SR at the east end of this track section (see Fig. 1B) and causes this relay to close its front contact 97 and approach light the signal 3. Under the conditions assumed, the coding direction relay 4WC is energized, and the home relay 3—4H and the distant relay 3—4D are energized by the clear code being transmitted west in track section 3—6T toward the signal 3, so that the green lamp of signal 3 is lighted over a circuit readily traced through the front contacts 97, 98, 99 and 100 of the relays 4SR, 4WC, 3—4H, 3—4D.

In the arrangement shown, the series relay 4SR upon closing its front contact 102 establishes a stick circuit for holding it energized as long as the wheel shunt exists independently of the coding operation of the transmitter relay 4CTP, this expedient being employed so that this series relay 4SR does not need to have slow release characteristics to hold up during coding operation, or have a slow release repeater relay. In order that this series relay at 4SR may not erroneously energize its associated track relay, it opens at its back contact 103 the circuit through the code following track relay 4TR, this also incidentally constituting a check to assure that the series relay releases after each train movement, otherwise no code can be received at the corresponding signal location.

The energization of the series relay 4SR also forms an auxiliary stick circuit for the coding direction relay 4WC from (+), through front contact 104 of relay 4SR, back contact 105 of repeater relay 4TP, front contact 106 of relay 4WC, winding of this relay 4WC, and back contact 21 of relay 3EC, to (—). Consequently, when a train passes the signal 3 and shunts track relay 3TR and releases its repeater relay 3TP, the coding direction relay 4WC is maintained energized by this auxiliary stick circuit until the signal relay 3—4H releases and closes at its back contact 107 a permanent stick circuit readily traced for relay 4WC. In this connection, it should be understood that the track relay repeater 3TP is arranged to have a substantially shorter release time than the signal relay 3—4H, say .6 of a second as compared with 15 seconds, so that when the coding operation of the track relay 3TR ceases under other circumstances when the series relay 4SR is not energized by an approaching train, the coding direction relay 4WC drops, because its pick-up circuit is broken at the front contact 20 of relay 3TP before its stick circuit is established at the back contact 107 of relay 3—4H.

By reason of this special control of the coding direction relay 4WC, it performs the functions of a directional stick relay as commonly employed in single track signaling systems; and after the east-bound train in question has passed entirely into the track section 3—6T in advance of the signal 3, a code at the 75 rate is delivered to the track section 1—4T in the rear of this signal with the relay 4WC energized to close its front contact 33, and the relay 3—4H deenergized closing its back contact 32, thereby providing a caution code in the rear of the east-bound signal 3 to permit the head-block signal 1 or 1A to be cleared for a following train movement if desired, as shown in the diagram of Fig. 2C.

When the east-bound train in question enters track section 3—6T, the series relay 6SR for the east end of this track section is energized to approach light the signal 5 (Fig. 1C) and provide an auxiliary stick circuit for the relay 6WC in the same manner just explained. Under the normal conditions as shown in the diagram of Fig. 2C, the signal 5 will display a caution indication, since the entering signals 7 and 7A are at stop; but under ordinary circumstances the operator will have previously positioned the switch and signal levers for the siding end B to clear one of the entering signals 7 or 7A for the train in question to enter the siding section or passing siding, as the case may be.

Assume, for example, that the operator causes energization of the signal clearing relay BRD (see Fig. 1D) for movement of the east-bound train in question into the siding section. The closing of the front contact of this relay BRD closes a circuit for energizing signal relay 7G to clear signal 7, which may be traced from (+) through front contact 112 of relay BRD, front contact 113 of detector relay BTR, front contact 114 of normal correspondence relay BNCR, relay 7G, front contact 115 of signal control relay 7H, and front contact 116 of relay 7TP, to (—). Since the normal prevailing direction of coding in the siding section is west-bound and signal control relay 7H is energized, the entering signal 7 may be cleared without modifying the direction of coding in the siding section. In a similar way the low speed or diverging signal 7A may be cleared by energization of signal relay 7AG upon energization of the signal clearing relay BRD and closing of its front contact 112 if the switch is operated to the reverse position to close front contact 118 of the reverse correspondence relay BRCR.

When the east-bound train under consideration approaches signal 5, this signal should indicate caution if both of the entering signals 7 and 7A are at stop, or if the entering signal 7A has been cleared by the operator for a train movement into the siding, and should indicate clear only if the entering signal 7 has been cleared by the operator for a train movement into the siding section over the switch in the normal position. Thus, as shown in Fig. 1D, the code rates for governing the clear and caution indications of the signal 5 are selected by front and back contacts 15 of the signal relay 7G.

When the east-bound train in question passes the intermediate signal 5, as shown in the diagram of Fig. 2D, a 75 code rate is transmitted to the intermediate signal 3 in the rear, and the coding operation of the track relay 3TR (Fig. 1B) picks up its repeater relay 3TP to close its front contact 20 and hold up the relay 4WC by its pick-up circuit, and also causes energization of the relay 3—4H to increase the code rate in the track section 1—4T to the clear rate of 120, thereby permitting the head-block signal 1 to give a clear indication for a following train movement if desired. It will be noted that the control circuits for the signal 1 (see Fig. 1A) are organized so that the green lamp G is lighted by the energization of either of the decoding relays 1D and 1DX responsive respectively to 120 and 180 code rates.

When the east-bound train under consideration passes the entering signal 7 into the detector track section BT at the siding end B (see Fig. 1D), the shunting of the detector track relay BTR releases the signal clearing relay BRD in the usual way, and also opens at its front contact 113 the energizing circuit for signal relay 7G, so as to hold the signal 7 at stop while the detector track section is occupied, even though the relay BRD might be again energized by a subsequent C. T. C. control code, and although the train being short or a single locomotive, has not advanced into the siding section to drop the signal control relay 7H.

When the east-bound train in question enters the siding track section 7—2T, cessation of the coding operation of the track relay 7TR releases its slow release repeater relay 7TP to connect the code transmitter relay 7CTP through the back contact 75 of relay 7TP, back contact 120 of relay 8G, coding contacts 75C, and front contact 121 of relay BTR, and thus permit relay 7CTP to be intermittently operated when the train leaves the detector track section and front contact 121 of the detector track relay BTR closes, thereby producing driven code pulses under and following the train.

Considering the operation for the movement of the east-bound train under consideration out of the siding section, and arranging Figs. 1D and 1A end to end to show the circuits for the complete siding, assume that the head-block signal 1 has been cleared to permit the east-bound train under consideration in the siding track section 7—2T to advance. When this train drops the detector track relay ATR, the transmitter relay 2CTP is steadily energized by a circuit from (+), through the back contact 36 of detector track relay ATR, back contact 37 of correspondence relay ARCR (switch being normal to permit signal 1 to clear), back contact 38 of relay CR, and relay 2CTP, to (—). When the train clears the siding track section 7—2T, this steady energization of the transmitter relay 2CTP is effective during the first off period of the driven code being transmitted from the other end to energize the track relay 7TR and its repeater relay 7TP to cut off at the back contact 75 of relay 7TP such driven code being transmitted in the reverse direction. As soon as the train leaves the detector track section AT, the front contact 36 of the detector track relay ATR connects the transmitter relay 2CTP to the coding contacts rather than directly to the local battery, so that the prevailing direction of coding in the siding section is restored without conflict between opposing driven codes.

Having explained in detail the operation for an east-bound train movement from the siding end A through the single track stretch into and through the siding section at the siding end B, it would appear unnecessary to consder in detail substantially the same mode of operation which would occur if the existing direction of track circuit coding as determined by the last train movement should happen to be suitable for west-bound train movements, and the operator desired to clear the head-block signal 8 or 8A for another west-bound train movement.

*Reversing the direction of track circuit coding through the single track stretch.*—Considering now the situation where the operator desires to clear a head-block signal for a train movement in a direction opposite to that already established by the direction of the last train movement through the single track stretch, it can be readily appreciated that the direction of track circuit coding has to be reversed; and to illustrate the operation of this system in this respect it is convenient to assume that the system is in the condition illustrated corresponding to the last train movement east-bound, and that the operator wishes to send a west-bound train from the siding end B toward the siding end A, either from the side track or from the siding section, as the case may be.

When the operator positions the switch lever BWL and the signal lever BGL in Fig. 3 for the train movement desired and actuates the start button BSB, a control code is transmitted on one operating cycle to energize the signal clearing relay BLD, and on another operating cycle a control code is transmitted to the field station at the siding end A to energize momentarily the code sending relay 1CS (see Fig. 1A). Assuming the operator takes this action while the track stretch is clear, the highest 180 code rate is being received at the siding end A, and the relay 1DX and its repeater relay 1DXP are energized, so that the delivery of the control code of (— —) to initiate coding operation is effective to energize momentarily the code sending relay 1CS by a circuit from (+), through contacts of the field station equipment indicated conventionally and designated (— —) CS, front contact 303 of relay 1DXP, back contact 304 of relay ALD, back contact 305 of relay ARD, front contact 306 of detector track relay ATR, and relay 1CS, to (—).

Since at this time a track circuit code is being received to operate the track relay 1TR, the signal control relay 1H is energized and provides a stick circuit for code sending relay 1CS from (+), through front contact 307 of relay 1H, and front contact 13 of relay 1CS, winding of relay 1CS, to (—).

This energization of the code sending relay 1CS connects the transmitter relay 1CTP through front contact 16 of this relay 1CS to coding contacts operating at the 75 or 120 rate dependent upon the condition of the signal relay 2G; and during the first off interval of the west-bound code being transmitted, the track relay 4TR at the opposite end of the track section 1—4T (Fig. 1B) is energized and in turn is repeater relay 4TP. The energizing circuit for the transmitter relay 4CTP at this end of the track section includes a back contact 18 of the track relay 4TR, so that the energization of this track relay 4TR during the first off period of the code being created by the operation of the transmitter relay 4CTP prevents energization of this transmitter relay, even though its associated oscillator contacts should happen to close before the opposing code pulse ceases. When the track repeater relay 4TP picks up, it opens at its back contact 22 the energizing circuit for the associated transmitter relay 4CTP, and remains up during the successive code pulses. Each front contact repeater track relay such as 4TP is preferably designed to pick up quickly in response to the first energization of its associated track relay, such as 4TR, and lock out code transmission from the corresponding end of the track section after the first impulse of the conflicting coding, but it can be appreciated that this is not essential, since such repeater relay as 4TP will be ultimately energized after a few pulses of the conflicting code. Also, each of these track repeater relays TP is sufficiently slow release to maintain its contacts picked up between the successive impulses of any code.

In this way, when a driven code in opposition to the then existing driven code is applied by the energization of the code sending relay 1CS to reverse the direction of coding, the code pulses in the then existing direction will be overpowered and cancelled, and a new direction of coding is established.

When the coding operation in the track relay 1TR ceases and the relay 1H drops, the code sending relay 1CS is left energized by a stick circuit through the back contact 12 of the track relay 1TR.

Considering the operation occurring at the intermediate signal 3 in Fig. 1B, the energization of the track relay repeater 4TP establishes a circuit to energize the transmitter relay 3CTP from (+), through front contact 130 of relay 4TP, back contact 106 of the relay 3EC, back contact 33 of relay 3EC, transmitter relay 3CTP, to (—). This disconnects track relay 3TR from the track rails, and after a time interval its repeater relay 3TP releases, opening its front contact 20 to deenergize the coding direction relay 4WC and closing its back contact 21 to permit energization of the other coding direction relay 3EC, whereupon the transmitter relay 3CTP is disconnected from the front contact 130 of the track repeater relay 4TP, and is connected through the front contact 33 of relay 3EC to the 120 or 75 coding contacts through the lower front or back contacts 32 of the signal control relay 3—4H. The relay 3—4H is ordinarily sufficiently slow releasing to hold up during the operation of dropping relays 3TP and 4WC and energization of relay 3EC, and is immediately energized as soon as the relay 3EC picks up and connects the quick acting repeater relay 3—4TP to back contact 18 of the track relay 4TR, so that the proceed 120 code rate will be sent at once; but this relay timing is not material, since a 75 code may be sent and then changed to the 120 rate.

While this operation just described is occurring, the steady energization of the transmitter relay 3CTP at signal location 3 acts during the first off period of the code pulses being transmitted west in the next track section 3—6T to energize the track relay 6TR and its repeater relay 6TP at the signal location 6 in Fig. 1C, whereupon the same operation just described is repeated at this signal location, resulting in the steady energization of the transmitter relay 5CTP for a limited time.

Referring now to Fig. 1D, the prolonged energization of the transmitter relay 5CTP during the first off interval of the code pulses in the end track sections 5—8T energizes the track relay 8TR and opens at its back contact 12 the stick circuit holding up the code sending relay 8CS, so that this relay drops and discontinues the transmission of west-bound code pulses.

Thus, by initiating coding operation at the end of the single track stretch then receiving code pulses, as transmitted for a previous train movement, this existing direction of coding is overpowered and bucked down, so to speak, over the successive track sections of the stretch until the code sending relay CS providing this coding is deenergized, whereupon track circuit coding in the new direction is established and continues without interference to provide for clearing of the intermediate signals and a head-block signal for the new direction of train movement.

In this connection, it can be seen that the direction of track circuit coding, once established by supervisory manual control, continues until opposing code pulses are transmitted over the track rails of the successive track sections of the stretch, and it is apparent that if the stretch is occupied by a train, any attempt on the part of the operator to clear an opposing signal carelessly or by mistake would not change the existing direction of coding and put to stop an intermediate signal and stop such train. When a train has accepted a head-block signal that has been manually cleared, as for example the signal 1 in Fig. 1A, the opening of the front contact 306 of the detector track relay ATR prevents energization of the code sending relay 1CS and the bucking down of the existing code until this train gets into the single track stretch.

It may be also expedient to explain here that the front contact 303 of the relay 1DXP, for example, in the circuit permitting energization of the code sending relay 1CS by C. T. C. control, also acts to prevent any code reversal while the stretch is occupied, upon an attempt to clear the opposing head-block signal 8 or 8A. However, the presence of the train in the stretch alone is sufficient to block the knock-down effect of opposing code pulses, so that this front contact 303 of the relay 1DXP is not necessary for this purpose; but it is preferably employed to assure that a reversal of code while the stretch is occupied will not inadvertently occur in one or more track sections upon an attempt to clear an opposing head-block signal, and thus clear an intermediate signal, which the train may perhaps accept and make a back-up move contrary to the expectations of the operator. This is an optional refinement, and may be omitted without interfering with supervisory manual control of back-up movements as later discussed.

*Reversal of coding in a siding section.*—The method above discussed of determining the direction of coding in the single track stretch by initiating coding operation by C. T. C. control for a direction opposite to the then existing direction of code transmission, may also be applied to siding sections; but in that case, it can be readily appreciated after due consideration that the problem of organizing the C. T. C. system to provide control codes for initiating track circuit coding and signal clearing at the opposite ends of the siding sections, as well as the single track stretches, is complicated by the fact that a given C. T. C. field station would be required to control the energization at different times of two code sending relays CS, sometimes in connection with the clearing of an opposing head-block signal, and sometimes in connection with the clearing of an opposing entering signal. In order to avoid such complications, and particularly since a siding section is a single track section where no following train movements, back-up train movements, or outlying switches are involved, it is proposed in accordance with this invention to employ a different method for determining the direction of coding in the siding sections.

Referring to Figs. 1D and 1A, arranged end to end to show a complete siding section, code pulses are transmitted over the track rails of this siding section in a predetermined prevailing direction under normal conditions, which may be selected to be either direction, but is illustrated as west from the siding section A to the siding section B. This normal prevailing direction of coding in the siding section permits an entering signal 7 or 7A to be cleared without any reversal in the direction of coding; and as already explained, the prevailing direction of coding is restored in the siding section after each east-bound train movement.

Assume, however, that an operator wishes to move a train west-bound past the entering signal 2 into the siding section. When he positions the signal lever AGL (Fig. 3) to the left and actuates the start button ASB, with the switch lever AWL normal, to correspond with the ordinary manipulation for making the train movement in question, a control code is delivered to the field station at siding A to energize the relay ALD in the usual way. Assuming that the opposing entering signal 7 has not been cleared for any opposing train movement, and that the inverse or off code pulses are being transmitted to cause coding operation of the track relay 2TR and energization of the relay 2H, then this energization of the relay ALD by C. T. C. control closes a pick-up circuit for the code reversing relay CR from (+), through front contact 136 of relay ALD, back contact 137 of switch control relay AWR, front contact 138 of relay 2H, and relay CR, to (—).

This energization of the code reversing relay CR opens at its back contact 38 the circuit for the transmitter relay 2CTP and stops transmission of the code pulses in the prevailing direction, whereupon coding operation of the track relay 7TR (Fig. 1D) at the other end of the siding track section stops, and its repeater relay 7TP drops after a time to close its back contact 75 and connect the transmitter relay 7CTP to the coding contacts over a circuit previously explained and readily traced on the drawings.

Upon cessation of the driven code pulses in the prevailing direction, the associated inverse code pulses also stop; but the repeater track relay 7TP ordinarily releases and starts driven code pulses east to resume coding operation of the track relay 2TR (Fig. 1A) before the slow releasing signal control relay 2H drops. As illustrated, the front contact 138 of the relay 2H in the pick-up circuit for the relay CR is shunted by a front contact 139 of this relay CR to assure that it will be maintained energized in spite of variations in the ordinary timing operations of the relays.

When the prevailing direction of driven code is reversed, and driven code pulses are received to cause energization of the signal control relay 2H, the energizing circuit for the signal relay 2G readily traced on the drawings is closed to clear the signal 2. It will be noted that this energizing circuit for the signal relay 2G includes a front contact 140 of the code reversing relay CR; and since no driven code can be transmitted from the corresponding end of the siding track section while the relay CR is energized due to its back contact 38, it is assured that the coding operation of the track relay 2TR and energization of the relay 2H while the relay CR is energized is due to legitimate driven code pulses transmitted from the opposite end of the siding section.

After the direction of coding has been thus reversed in the siding section for a west-bound train and this train accepts signal 2 (Fig. 1A) and drops the detector track relay ATR, an auxiliary stick circuit through the back contact 141 of the relay ATR and front contact 142 of the relay CR is established for maintaining the relay CR energized after the signal clearing relay ALD is released in the usual way to open the pick-up circuit for relay CR. When the train leaves the detector track section, the relay CR drops and the transmitter relay 2CTP is then connected to coding contacts to provide driven code pulses under and following up this train.

Assuming that the signal 8 (Fig. 10) has been cleared to allow this train to advance, the dropping of the detector track relay BTR opens at its front contact 121 the energizing circuit for the transmitter relay 1CTP, so that when the train clears the siding section, the driven code pulses following this train up in the prevailing direction are effective without interference to energize track relay 1TR and its repeater 1TP and restore normal conditions.

Since the reversal of the prevailing direction of driven codes in the siding section is accomplished by cutting off this code by the energization of the signal clearing relay ALD and this relay may be energized by C. T. C. control at any time, it is important that this action should not occur if opposing entering signal 1 has been cleared; and it is for this reason that the inverse code is provided in the siding section. Assume, for example, that the operator has cleared the signal 1 for an east-bound train movement into the siding section. The energization of the signal clearing relay BRD for this purpose and the opening of its back contact 73 opens the circuit providing the inverse code pulses, thereby deenergizing signal control relay 2H, so that if the operator thereafter accidentally or carelessly should attempt to clear the entering signal 2 by the energization of the relay ALD, the code reversing relay CR is not energized.

In order to prevent the operator manually putting signal 1 to stop, after it has once been cleared for a train that may be approaching, and then immediately cleared the opposing signal 2, a front contact 74 of the lock stick relay 1LS associated with the signal 1 is also included in the inverse code creating circuit. By reason of this control, the inverse code cannot be reinstated to permit energization of the code reversing relay CR for a prescribed interval after the signal 1 has once been cleared and then put to stop. Consequently, if there should be a train approaching the siding section at high speed and relying upon the proceed indication of signal 1, such train will have time to stop at the signal 1 when it is manually put to stop, or will pass into the siding track section or detector track section and by its presence prevent clearing of the opposing signal 2 before the manual control to clear that signal 2 is effective.

For similar reasons a front contact 34 of the lock stick relay 2LS associated with signal 2 is included in the circuit for causing coding operation of the transmitter relay 2CTP; and once the signal 2 has been cleared and then put to stop, coding in the prevailing direction cannot be established for a time to clear the opposing entering signal 1. The entering signal 1, however, may be safely cleared, as in the case of a meet, when the signal 2A is cleared for a west-bound train movement into the siding, so that transmission of signal clearing code pulses west in the siding section should not be prevented when signal 2A is cleared; and since the particular control circuits shown in Fig. 4 cause the relay 2LS to be deenergized by the clearing of signal 2A as well as signal 2, a front contact 143 of the reverse correspondence relay ARCR is provided to shunt the front contact 34 of the relay 2LS.

Under some operating conditions, as in the case of trains making a meet at a passing siding, it is desirable to be able to clear the entering signal 2, for example, to bring a westbound train into the main track siding section when the opposing low speed entering signal 1A has been cleared for an east-bound train movement into the siding over the corresponding switch in the reverse position, the same being true in the case of the entering signals 1 and 2A. Accordingly, provision is made in this system so that coding in the siding section is not affected when either signal clearing relays BRD or ALD is energized with the corresponding switch controlled to assume the reverse position. For example, when the signal clearing relay BRD is energized to clear signal 1A for a train movement into the siding, the prior energization of the switch control relay BWR on the same operating cycle of the code C. T. C. system closes a front contact 144 (Fig. 1D) to shunt the back contact 73 of the relay BRD and prevent interruption of the inverse code in the siding section, so that subsequent energization of the signal clearing relay ALD is effective to pick up the code reversing relay CR and reverse the direction of coding at the siding section to clear the entering signal 2. Similarly, when the signal clearing relay ALD is energized with the associated switch controlled to the reverse position, the open back contact 137 of the switch control relay AWR then energized prevents energization of the code reversing relay CR, and leaves coding in the siding section in the prevailing direction to allow clearing of the opposing entering signal 1 if desired.

For similar reasons, the dropping of the detector track relays when the associated switches are in the reverse position does not effect the transmission of driven codes in the siding section to put to stop or prevent the clearing of an opposing entering signal. For example, if a train drops the detector track relay ATR with the associated switch set in the reverse position for this train to enter or leave the siding, the transmitter relay 2CTP is connected to the coding contacts by a front contact 37 of the correspondence relay ARCR independently of the front contact 36 of the detector track relay ATR, so that coding in the prevailing direction is maintained in the siding section for clearing the entering signal 1. At the other siding end B (Fig. 1D), when the corresponding switch is in the reverse position, the front contact 145 of the correspondence relay BRCR supplies current to the driven code operating circuit for the transmitter 1CTP independently of the front contact 121 of the detector track relay BTR.

*Back-up train movements.*—In the operation of single track railroads, it is sometimes desirable to permit a train which has entered the stretch of single track at one end, to reverse its direction of movement and make a back-up movement toward the same end of the stretch at which it entered. For example, a train may be sent into the single track stretch to deliver men or work material along the track, or for some other purpose, and it is desirable to permit this train to return under signal protection to the same siding from which it started. The system of this invention provides for such back-up moves with full safety and facility under the supervisory manual control of the operator.

As a typical example of the operation for such a back-up move, assume that under the conditions of coding in the single track stretch illustrated, an east-bound train advances beyond the first intermediate signal location 3 in Fig. 1B, as shown in the diagram of Fig. 2E, and immediately or at some time later desires to make a back-up move toward the siding end A. Under normal operating conditions, as shown in the diagram of Fig. 2C, the intermediate signal 4 does not clear behind the east-bound train under consideration, because there are no code pulses in the track section 1—4T toward this signal 4 to operate the track relay 4TR. Also, under these conditions the coding direction relay 4WC is maintained energized by the train in the track section 3—6T, so that the repeater relay 3—4TP is not operable by the track relay 4TR, even though code pulses were being transmitted; and furthermore, the other coding direction relay 3EC is deenergized to cause the signal 4 to indicate stop. Also, if this signal is a color light signal approach lighted as indicated it would not be lighted in any event.

In order to clear the intermediate signal 4 for the train to make the back-up move under consideration, the operator follows the usual manipulation of switch and signal levers he naturally would employ to bring the train back into the passing siding or siding section by sending a control code to energize the signal clearing relay ALD in Fig. 1A, with the switch positioned in the normal or reverse position as desired. This energization of the relay ALD and closing of its front contact 304 energizes the code sending relay 1CS over a circuit from (+), through front contact 304 of relay ALD, back contact 305 of relay ARD, front contact 306 of detector track relay ATR, and relay 1CS, to (—).

The energization of the code sending relay 1CS in this way applies driven code pulses to the west end of the track section 1—4T, and these code pulses act in the same way previously discussed in connection with the reversal of the direction of coding in the single track stretch to energize the track relay 4TR (Fig. 1B) and its repeater relay 4TP to cut off the code pulses being transmitted west for following train movements. The energization of the relay 4TP opens at its back contact 105 the stick circuit through the back contact 107 of the relay 3—4H then holding up the relay 4WC, thereby releasing this relay 4WC and causing energization of the relay 3EC, whereupon the repeater relay 3—4TP is made responsive to the coding operation of the track relay 4TR and the resultant energization of the relay 3—4H so that the relay 3—4D is effective to exercise a caution or proceed control for the signal 4. Also, with the relay 3EC energized, the transmitter relay 3CTP is connected to coding contacts and applies code pulses to the track rails of the track section 3—6T under the train in question, thereby energizing the series relay 3SR to light the signal 4. Thus, conditions for a back-up train movement as shown in the diagram of Fig. 2E are established.

Referring to Fig. 1B, when the train in question starts its back-up move and enters the track section 1—4T, the series relay 3SR is then energized and provides the auxiliary stick circuit for holding the relay 3EC after the relay 4TP drops and until its final stick circuit is established through dropping of the relay 3—4H. Consequently, when the train in question clears the track section 3—6T, the direction of coding in this track section and the remaining track section of the stretch is reversed and the head-block signal 8 or 8A may be cleared for some following train if desired.

When the train making the back-up move enters the detector track section AT, the signal clearing relay ALD is deenergized in accordance with the regular operation; but the code sending relay 1CS is held up by its stick circuit through the back contact 12 of the track relay 1TR, thereby leaving the several track sections of the stretch coding east to conform with the last train movement in the stretch ready for subsequent reversal or following train movements as may be desired.

A similar operation will occur to clear both of the intermediate signals 4 and 6 if the east-bound train assumed to have entered the stretch should advance beyond the signal 6 before making the back-up move; and it can be understood, without further explanation, how the system will operate in a similar manner to clear intermediate signals for west-bound trains entering into the single track stretch to make back-up movements past signals 3 and 5 under supervisory manual control of the operator.

In connection with such a back-up movement past signal 4, it can be seen that when the repeater relay 4TP is energized to clear this signal 4, the back contact 22 of this relay 4TP prevents any coding operation of the transmitter relay 4CTP, so that there is no coding west to clear either of the opposing head-block signals 1 or 1A. If the operator, after once causing energization of the signal clearing relay ALD to reverse the direction of coding in the track section 1—4T for a back-up move as explained, should for some reason manually restore this relay ALD and cause energization of the other signal clearing relay ARD, the direction of coding in the track section 1—4TR is not affected, since the code sending relay 1CS is held up by its stick circuit through the back contact 12 of the track relay 1TR; and consequently a head-block signal 1 or 1A cannot be cleared. In other words, there is a positive interlock between the opposing head-block signals 1 and 1A with the intermediate signal 4 to prevent clearing of a head-block signal once this intermediate signal has been cleared for a back-up movement.

In this connection, in the event that the operator should clear the intermediate signal 4 inadvertently or by mistake when the east-bound train is not to make any back-up move, he cannot change the controls and clear a head-block signal 1 or 1A for a following train movement until this train has left the stretch, and a C. T. C. control code is subsequently transmitted to the siding end B to energize the code sending relay 8CS to buck down the then existing coding for west-bound train movements. Considering this operation more in detail, when the east-bound train in question passes each intermediate signal 3 and 4, the code prematurely set up for a back-up move and following up this train acts to overpower the coding that would otherwise be left behind the train for following train movements; and when this train leaves the stretch, this following code automatically releases the code sending relay 8CS. Thus, after faulty manipulation on the part of the operator to clear west-bound signals 4 and 6 for a back-up train movement that is not made, the track circuits of the single track stretch are left coding in a direction suitable for such west-bound train movements; and in order to reverse this direction of coding to clear a head-block signal 1 to 1A for another east-bound train movement, the operator must send a C. T. C. control code to energize the relay 8CS sometime after the stretch becomes unoccupied.

Under the same operating conditions, with an east-bound train beyond the intermediate signal 4, if the operator having cleared a head-block signal 1 or 1A should carelessly put this signal to stop and then cause energization of the signal clearing relay ALD, the code sending relay 1CS is energized, but no code pulses can be transmitted to clear the intermediate signal 4, until after a prescribed time to safeguard any approaching train that may have accepted the head-block signal 1 or 1A previously cleared, because the energizing circuit for the transmitter relay 1CTP is open at the front contact 14 of the lock stick relay 1LS associated with the signals 1 and 1A. In other words, the operator cannot invite an east-bound train to follow another east-bound train in the single track stretch by clearing a head-block signal 1 or 1A, and then quickly by faulty manipulation bring about the clearing of the opposing intermediate signal 4 and create a potentially dangerous situation of opposing train movements.

It may be explained here that the front contact 14 of the lock stick relay 1LS in the circuit for the transmitter relay 1CTP and the similar contact 14 of the lock relay 8LS in the circuit for the transmitter relay 8CTP, also perform the functions of preventing a quick reversal of the direction of coding in the single track stretch as a whole, so that after the operator has cleared a head-block signal at one end of the stretch, he cannot manually put this signal to stop and immediately clear the opposing head-block signal. For example, if the operator has cleared the head-block signal 1 for an approaching train, he cannot put this signal to stop by manually deenergizing the signal clearing relay ARD, and then shift the other signal lever and transmit control codes in the direction of coding through the stretch to clear the opposing signal 8 or 8A. In this case, the code sending relay 1CS can be energized, but the open front contact 14 of the lock stick relay 1LS prevents the transmission of code pulses for a predetermined time after the signal 1 was put to stop. Consequently, if a train is approaching the signal 1 at speed and cannot stop when this signal once cleared has been manually put to stop, during the prescribed time interval it will get into the detector track section AT or the single track stretch and prevent reversal of the direction of coding and clearing of the opposing head-block signal, when the lock stick relay 1LS is ultimately restored and coding east can start.

*Outlying switches.*—On single track railroads outlying switches in the single track stretches are sometimes needed for connections with industrial tracks or the like. In some cases such outlying switches may be equipped for power operation under C. T. C. control and provided with signals governing train movement into and out of this switch the same as at the end of a passing siding; but when traffic movements into and out of such switch are relatively infrequent, it may be expedient to use a hand-operated switch of the usual type.

Such a hand-throw outlying switch is indicated by dash lines OLS in Fig. 1B as a typical example of such a situation. When a train entering the single track stretch from either end leaves the stretch by this outlying switch, normal operating conditions are restored the same as if the train left the stretch at the other end, including the extinguishing of the occupancy lamp on the control panel hereinafter described.

In the case of train movement from the outlying switch into the single track stretch, as indicated in the diagram of Fig. 2F, it is contemplated that a member of the train crew will use the usual telephone provided at the switch to call up the operator in the control office for permission to come out. When it has been determined that it is proper for the train to come out and move toward the next siding, and the operator in consultation with the train crew has settled on the direction in which this train is to move, he merely positions the signal lever AGL or BGL, as the case may be, to clear an entering signal at the end of this stretch where the train is to leave, and then gives the train crew permission over the telephone to throw the switch and come out.

If it should happen that the then existing direction of track circuit coding as determined by the last train movement is suitable for the train to come out of the outlying switch and move in the desired direction, this energization of the signal clearing relay such as BRD, for example, merely tends to energize a code sending relay 8CS already energized. If, however, the train coming off of the outlying switch is to move in the direction opposite to the then existing direction of track circuit coding, energization of the signal clearing relay for the proper entering signal, as for example the energization of the relay ALD for the siding end A under the conditions illustrated closes its front contact 304 to energize code sending relay 1CS, and acts in the manner previously explained to overpower the existing coding in the successive track sections, release the code sending relay 8CS at the opposite end of the stretch, and establish coding in the proper direction to clear the intermediate signals for the desired train movement.

It is contemplated that operation of the outlying switch to the reverse position will shunt the track rails at that point, or as illustrated will open switch circuit controller contacts or the equivalent to break a connection 146 around the insulated joint 147 at the switch to put to stop signals governing train movement toward the switch in the usual manner. For example, assuming a direction of track circuit coding west as shown in the drawings, when the outlying switch in Fig. 1B is opened for a train to come out, the connection 146 around an insulated joint 147 in the track rails is broken, and stops coding operation of the track relay 3TR, whereupon its repeater relay 3TP drops and releases relay 4WC before the relay 3—4H drops, thereby cutting off the west coding in the end track section 1—4T, and preventing clearing of a head-block signal 1 or 1A, even if the operator should carelessly try to clear one of these signals after having given the train permission to come out of the outlying switch.

When a train coming off of the outlying switch passes out of the single track stretch at either end into the corresponding detector track section, the associated signal clearing relay ALD or BRD for the associated entering signal is automatically deenergized in the regular way, and the system assumes its normal condition ready for any desired subsequent train movement.

If the train in question should have to pass an intermediate signal in making its movement from the outlying switch to one of the sidings, as for example in the case of a train coming off of the switch shown in Fig. 1B and moving east past the intermediate signal 5 in Fig. 1C, the corresponding coding direction relay such as 6WC is held up by its stick circuit to leave coding behind the train for following train movements in the same manner characteristic of the train movement through the single track stretch from one end.

It may happen that, after setting up conditions for a train to come off of the outlying switch, there is some delay or some reason for changing plans; and in such a case, the operator merely puts to stop manually the entering signal that he cleared for the intended train movement, leaving the code sending relay 1CS or 8CS, as the case may be, energized by its stick circuit to maintain coding in the corresponding direction ready to be used or reversed as may be desired for some subsequent train movement. This assumes that the train has remained out of the stretch and has advised the operator. But even if the train passed over the outlying track switch into the stretch, the operator could place the entering signal to stop so as to hold the train at signal 2 or signal 7 for example, it being noted that such manipulation does not put to stop any intermediate signals cleared for the selected direction.

*Occupancy indications.*—In connection with the supervisory manual control of traffic on single track railroads and the like, it is desirable to indicate in the control office for the information of the operator whether or not certain portions of the track are occupied by a train. In addition to the usual indications of occupancy of the detector track sections, it is proposed in this system to indicate occupancy of each siding section and each single track stretch as a whole. The occupancy indications for the detector track sections are transmitted by the code C. T. C. system in the usual way, such as disclosed, for example, in the Hailes et al. Patent No. 2,259,561 previously mentioned; but different expedients are employed for the occupancy indications for the siding sections and single track stretches.

While the indications may be transmitted in any suitable manner in accordance with the operating characteristics of the C. T. C. system employed, it is assumed in the specific arrangement illustrated that these indications will be transmitted in accordance with the disclosure of the Hailes et al. patent above mentioned. In this type of C. T. C. system, a field station is conditioned to transmit indications by the momentary opening of a starting circuit upon a change in the switch, signals, or track circuit to be indicated; and in connection with the geographic lockout and cycle distribution features characteristic of this particular C. T. C. system, each field station is effective to transmit indications only when its lockout relay LO is energized. Certain of the code elements transmitted from a field station in this system during an indication cycle identify and register that station in the control office, and other code elements of either a short or long character are transmitted for each of a plurality of indication channels, in accordance with the condition of the relay or device being indicated, to provide the equivalent of the energization of a corresponding indication relay in the control office with a (+) or (—) polarity.

With this brief explanation of the operating characteristics of the code C. T. C. system contemplated, and considering first the means employed in accordance with this invention for providing occupancy indications for the single track stretches, under normal conditions and when the stretch is not occupied, one of the decoding relays 1DX or 8DX in Figs. 1A and 1D is energized, dependent upon the existing direction of track circuit coding through the stretch. Generally speaking, in accordance with this invention, when either of these relays 1DX or 8DX is deenergized by the entrance of the train into the stretch, an indication of occupancy is transmitted to the control office and registered until another indication is transmitted upon the subsequent energization of one of these relays 1DX or 8DX when the stretch becomes vacant.

Assuming the existing direction of coding to be west as shown in the drawings, and referring to Fig. 1A, when an east-bound train enters the single track stretch, the coding operation of the track relay 1TR stops, and the relay 1DX drops prior to the release of its slow release repeater 1DXP to close a pick-up circuit for an indication control relay ATK from (+), through the back contact 152 of relay 1DX, front contact 153 of relay 1DXP, back contact 154 of relay 1CS, and relay ATK, to (—). This relay ATK is held up by a stick circuit through its front contact 155 and the back contacts 156 and 157 in multiple of relays LV and LO of the code C. T. C. system. The relay LO is energized when the corresponding field station of the C. T. C. system at the siding end is transmitting indications, and the relay LV is energized on the last step at the end of the indication cycle, as explained more in detail in the patent to Hailes, et al. above mentioned, so that the indication control relay ATK once energized is held up until an occupancy indication is transmitted over an indication channel *a* through its front contact 158 and then this relay ATK is automatically released at the end of the indication cycle. After the relay ATK is energized and when the relay 1DXP is deenergized, the contacts 159 of the relay 1DXP momentarily open the starting circuit for conditioning the field station in question to transmit indications when it gets a chance.

The relay 1DX is released at times other than by the occupancy of the stretch when the code sending relay 1CS is energized for reversal of the direction for some desired train movement, but the back contact 154 of this relay 1CS in the pick-up circuit for the indication control relay ATK prevents this relay from being improperly energized under such conditions.

Referring to the control equipment shown in Fig. 3, the indication transmitted on channel *a* when the relay ATK is energized corresponds with a (+) indication and energizes the lower winding of the neutral indication relay AK to close its front contact 160 and light the accupancy indicating lamp 168; and this relay AK is maintained energized by a stick circuit through its front contact 161 and a back contact 162 of a clear-out relay CLO until that clear-out relay is subsequently energized over the indication channel *b* from either C. T. C. field station.

When the east-bound train under consideration leaves the single track stretch, either at the opposite end or at the outlying switch the 180 code rate is received at the siding end A and energizes the relay 1DX and its repeater relay 1DXP without changing the condition of the relay ATK; and when the relay 1DXP picks up, the operation of its contacts 159 cause another field start, and the closing of its front contact 164 sends over the channel *b* an indication corresponding to a positive polarity, thereby causing energization of the clear-out relay CLO in Fig. 3 to release the indication relay AK and extinguish the occupancy indicating lamp 168.

While the relay ATK is deenergized and its front contact 158 is opened, the indication transmitted corresponds with a negative energization of the channel *a* in the control office and is not effective to change the corresponding relay AK, so that after the initial transmission of an occupancy indication upon the deenergization of the relay 1DX, there is no change in the condition of the relay AK in the control office while the relay ATK is down during any other indication cycles that may occur due to a change in the switch, signals or the like. The same is true for the indication channel *b* governed by the relay 1DXP.

In this way, the indication control relay ATK, or the relay BTK for the other end of the stretch similarly controlled, acts to transmit an indication of occupancy to the control office when the stretch first becomes occupied, and causes energization of the corresponding indication relay AK or BK to light the occupancy lamp 168; and as soon as the stretch thereafter becomes a vacant, and a 180 code rate is transmitted to either end of the stretch, and the energization of the corresponding relay 1DXP or 8DXP, as the case may be, transmits a clear-out or cancelling indication to the control office to energize the relay CLO and release the relay AK or BK then energized to extinguish the occupancy lamp 168.

An indication of occupancy is given in a similar way when a train enters the stretch from an outlying switch such as shown in Fig. 1B. In this case, as soon as the outlying switch is opened to shunt the track rails, or as illustrated open the contacts 146 to break the electrical connection around an insulated joint 147, relay 1DX or 8DX is deenergized to pick up the corresponding indication control relay ATK or BTK, dependent upon the then existing direction of coding, thereby causing lighting of the occupancy lamp. In other words, the occupany lamp is lighted as soon as the switch is thrown and before the stretch is actually occupied by a train; but this is a proper indication, because the outlying switch in the open position acts the same as a train to prevent clearing of a head-block signal for train movement into the stretch. When the stretch becomes unoccupied, and the outlying switch is in its normal position, the 180 code rate is transmitted to one siding end or the other and energizes the relay 1DXP or 8DXP to cause transmission of an indication to energize the relay CLO in the control office and extinguishes the occupancy indication lamp.

It will be noted that the clear-out relay CLO in Fig. 3 is responsive to the energization of the channel *b* from the corresponding field station at either siding end, so that the occupancy indication will be cleared out or cancelled when the 180 code rate is received at either end of the stretch. Thus if the direction of coding should be reversed for some reason after the train has entered the stretch the reception of the 180 code rate at the end of the stretch opposite to that end at which the relay ATK or BTK was energized by the entrance of such train is effective to extinguish the occupancy indication when the stretch becomes vacant. If an east-bound train, for example, enters the stretch and sends an indication of occupancy by the energization of the relay ATK, and then the direction of coding is reversed by the energization of the code sending relay 1CS manually for this train to make a backup move, the code left behind this train after it passes out of the stretch in the new direction of coding is effective to energize the relay 8DXP and transmit an indication to energize the relay CLO and drop the relay AK to extinguish the occupancy lamp. In other words, regardless of which C. T. C. field station at a siding end acts to send an indication of occupancy in response to the cessation of coding at that end by the occupancy of the stretch, as soon as the stretch becomes vacant, this occupancy indication is cleared out by an indication from the field station at the siding and then receiving the high code rate (assumed to be 180 in this embodiment).

In connection with this occupancy indication for train movement off of an outlying switch, it is assumed that the train crew in compliance with prescribed rules will not open the switch until the operator has set up manually the direction of coding required for the desired train movement and has given the train crew permission, over the telephone to come out, otherwise there is a chance that the proper occupancy indication will not be given. For example, if it should be desired to move a train on the outlying switch as shown in Fig. 1B west toward the siding end A at a time when the direction of coding was established for east-bound train movements as shown in the drawings, and the switch should be thrown just at the time the operator has manually caused energization of the relays ALD and 1CS to set up coding in the proper direction for the desired train movement, the dropping of the relay 1DS under such conditions would not cause energization of the indicating control relay ATK, because its pick-up circuit would be open at the back contact 154 of the relay 1CS with the result that the indication of occupancy would not be transmitted, and the train could come out and occupy this stretch without lighting the indicating lamp in the control office. If, however, the outlying switch is not opened until the desired direction of coding has been established, then in the case assumed, the relay 8DX at the other end of the stretch would be deenergized to energize the relay BTK and transmit the desired indication of occupancy. In other words, in order to assure proper control of the occupany indications, the operating rules of the railroad should require that the train crew wait for specific permission from the operator to open the outlying switch, and the operator should be careful to wait until the proper direction of coding had been established before giving such permission, although from the standpoint of the proper and safe control of the signals, it makes no difference when the outlying switch is opened.

Considering now the occupancy indication for the main track siding section opposite a passing siding, this indication may be provided by indication control relays at each end governed in the same way as the relay ATK; but in the embodiment of the invention illustrated, as a variation or modification, a series or approach relay 2SR is provided for the end of the siding section from which the prevailing direction of driven code is transmitted (see Fig. 1A). When a train enters the siding section from the west end (Fig. 1D), the shunting action of its wheels and axles causes energization of the relay 2SR which at this time is being intermittently connected across the track rails in series with the track battery by the coding operation of the transmitter relay 2CTP. In the case of a west-bound train entering the siding section, when this train clears the detector track section AT, the coding operation of the transmitter 2CTP under the train likewise causes energization of the series relay 2SR. The series relay 2SR becomes deenergized in the usual way, as soon as the wheel shunt is removed from the siding section.

This series relay 2SR operates contacts 165 for starting an indication cycle and a contact 166 governing the code element on a particular step to transmit an indicating code for operating a mag-stick relay STK in the control office, as shown in Fig. 3, which governs the lighting of the indicating lamp 169 for the siding section.

The siding section is usually relatively short, so that a single series relay such as 2SR associated with one end of this section can be arranged to be energized upon the entrance of a train into the section at either end with adequate margins for reliable operation; but for long siding sections and under some unfavorable conditions of ballast leakage, it may be desirable to provide a series relay such as 2SR at each end of the siding section, the energization of either series relay acting to transmit an indication code to cause the lighting of the lamp 169 indicating occupancy of the siding section. If a series relay such as 2SR is used at each end of the siding section, it can be seen that these relays can be arranged to require a relatively large energizing current, since each will be energized upon the entrance of a train by the coding operation of the associated transmitter relay 2CTP or 7CTP directly under the train.

*Normally shut-down system.*—Under some conditions, particularly where primary batteries are used for the energization of the track circuits and local coding equipment, it is desirable in the interests of economy in current consumption and elimination of unnecessary coding operation of the apparatus, to provide a system in which the track circuits and associated apparatus are normally deenergized and inactive, and are in operation only when needed for actual train movement, the supervisory manual control afforded by the C. T. C. system serving to initiate coding operation when needed to clear a signal for some desired train movement. A system of this normally inactive or shut-down type is disclosed in the modification of Figs. 5A to 5D, which has in general the same operating characteristics as the normal coding form of the invention shown in Figs. 1A to 1D, in that if track circuit coding should for any reason be left in the single track stretch in a direction corresponding with the direction of the last train movement, this existing coding may be overpowered or bucked down if coding is required in an opposite direction for some desired train movement. In this normally inactive modification of Figs. 5A to 5D, a different arrangement of relays and circuits is employed for the control of the intermediate signals; and, if desired, this organization may be employed in connection with the normal coding form of the invention shown in Figs. 1A to 1D. In the normally shut-down modification of Figs. 5A to 5D, a different arrangement is employed for setting up the desired direction of coding in the siding section.

In the normally shut-down modification of Figs. 5A to 5D, under normal conditions as shown all of the track circuits are deenergized and with the exception of the lock stick relays 1LS, 2LS, etc., and certain other relays associated with the siding equipment, all the relays and circuits of the system are normally deenergized. Provision is also made, as shown, to have the decoding transformers normally deenergized, and to start operation of the code oscillators or equivalent apparatus employed for operating the coding contacts as and when necessary.

Figure 5A:
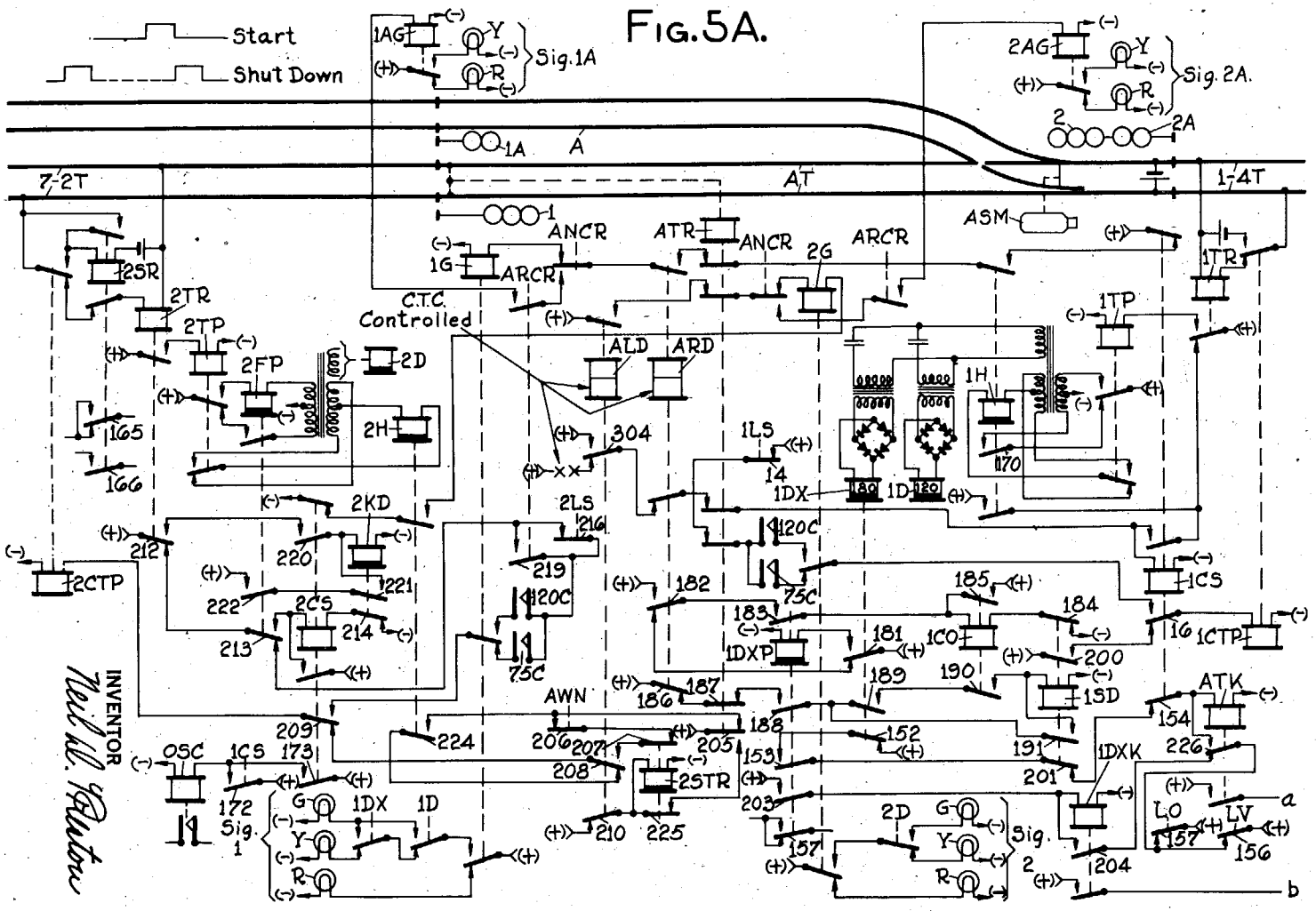
Figure 5B:
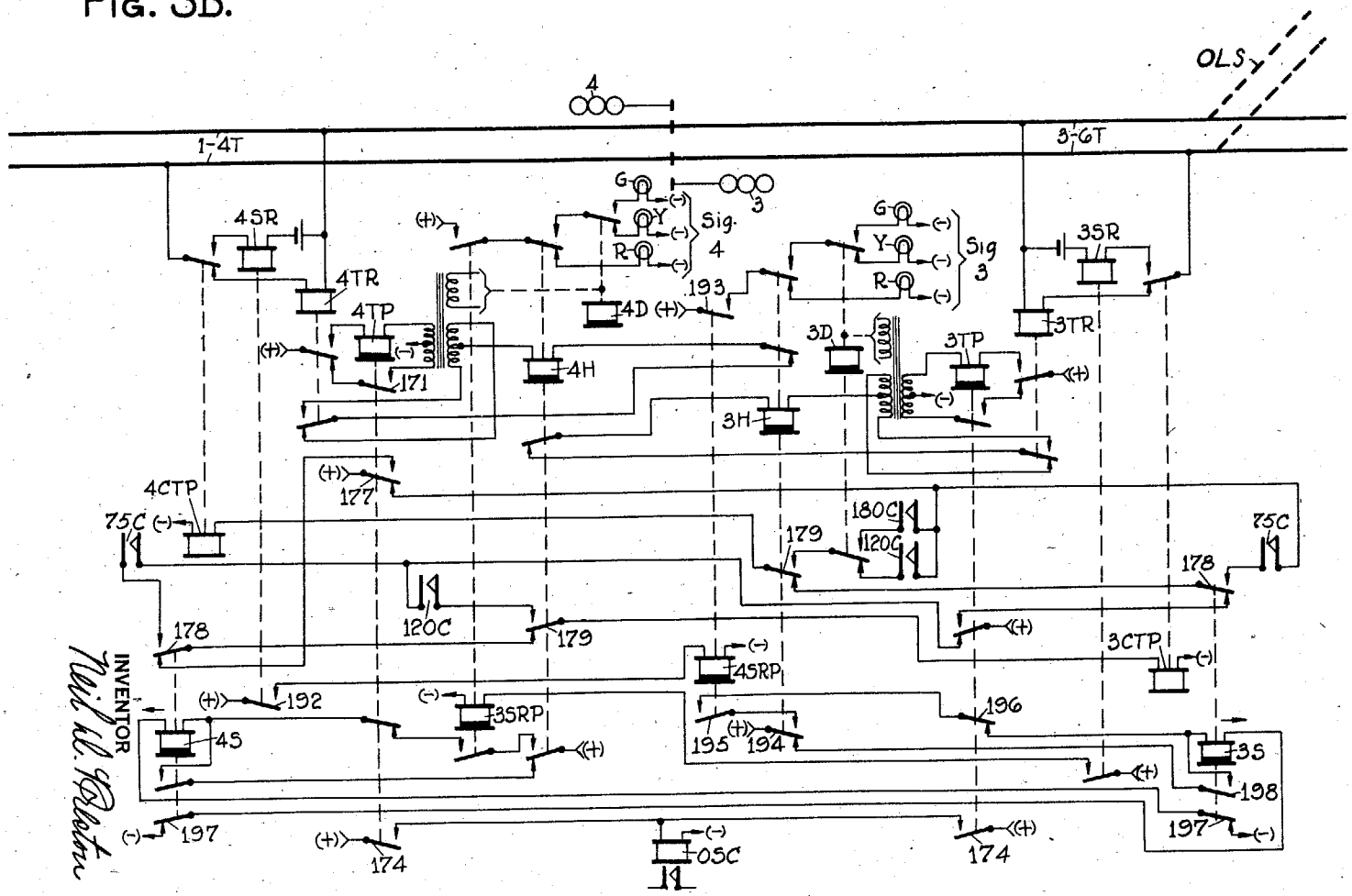

In the case of the decoding transformers for the head-block signals, the circuit for energizing the lower half of the primary of this transformer includes a front contact 170 of the corresponding home relay, such as home relay 1H in Fig. 5A, so that under normal conditions with the track relay repeater relay 1TP deenergzied, no current is supplied to the decoding transformer. When the home relay 1H has been energized by impulsing the upper half of this primary in response to one or more operations of the relay 1TP, dependent upon the operating characteristics of relay 1H, the front contact 170 of relay 1H closes; and the primary of the decoding transformer is then energized in the regular way. In the case of the decoding transformers for the ends of the siding section and intermediate signal locations, the slow-release front contact repeater relay, such as the relay 2FP in Fig. 5A and the relay 4TP in Fig. 5B, is arranged to be energized in series with the upper half of the primary when the track relay 4TR picks up; and the front contact 171 of this relay 4TP opens the energizing circuit for the lower half of the primary under normal conditions and until the track relay 4TR is operated by one or more code pulses.

The code oscillators for operating the coding contacts at different code rates, conventionally illustrated and designated OSC, are arranged to be set into operation for the siding ends, if coding is required for either the siding section or the single track stretch, when either of the associated code sending relays, such as 1CS and 2CS in Fig. 5A, is energized to close their front contacts 172 and 173. For the intermediate signal locations, the associated code oscillators OSC are set into operation when either one of the corresponding slow release front contact repeater relays, such as 4TP and 3TP in Fig. 5B, are energized to close their front contacts 174.

It is obvious that such normal deenergized condition of the various devices and circuits affords a substantial saving in the current consumption and permits the economical use of primary batteries, more particularly for the intermediate signal locations where there are no power operated switches or C. T. C. code equipment to be operated.

Considering the operation of this shut-down modification, and referring first to the single track stretch, assume that the operator desires to clear a head block signal 1 or 1A for an eastbound train movement into the single track stretch. When the operator has positioned the switch and signal levers for the siding end A for the desired train movement and initiates operation of the code C. T. C. system in the regular way as previously explained, a control code is transmitted to the siding end A to energize the signal clearing relay ARD, and a control code is likewise delivered to the siding end B on a preceding or subsequent operating cycle of the C. T. C. system to cause energization of the code sending relay 8CS in Fig. 5D over a circuit the same as previously explained (except for contact 303 of relay 8DXP), through back contacts 304 and 305 of relays BLD and BRD and front contact 306 of relay BTR. After such temporary energization by C. T. C. control, the relay 8CS is maintained energized by its stick circuit through the back contact 12 of the track relay 8TR and its front contact 13.

Figure 5C:
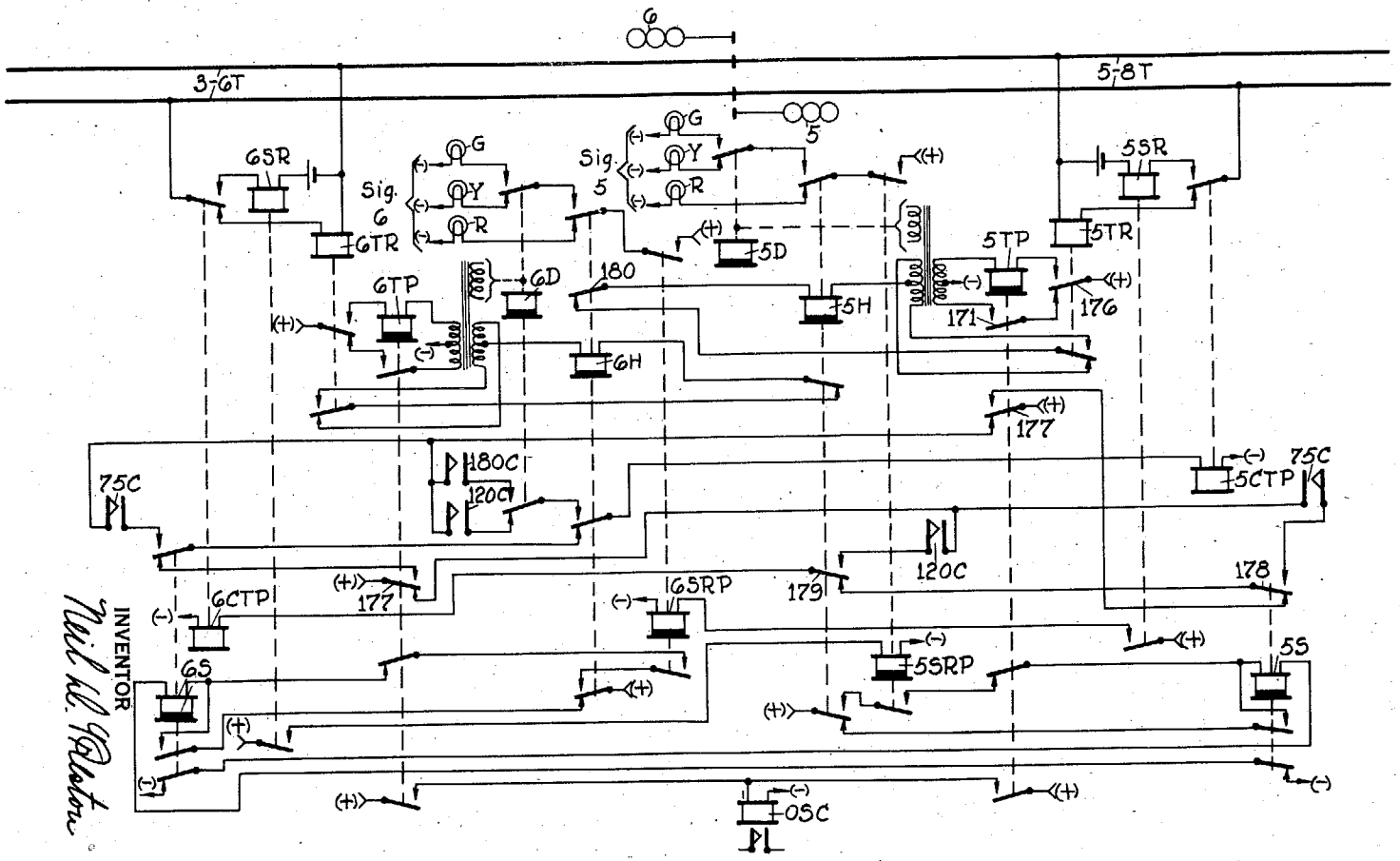

This energization of the relay 8CS initiates coding west in the end track section 5—8T to cause coding operation of the track relay 5TR in Fig. 5C. This coding operation of the contact finger 176 of relay 5TR causes energization of the track repeater relay 5TP to close its front contact 171 and allow energization of the lower half of the decoding transformer. The energization of the relay 5TP also closes its front contact 177 to supply energy to the code transmitter relay 6CTP through the back contact 178 of the directional stick relay 5S and back contact 179 of the signal control relay 5H; but the coding operation of the track relay 5TR immediately after one or two code pulses causes energization of the relay 5H over a circuit from the secondary of the decoding transformer through a back contact 180 of the opposing signal control relay 6H, thereby operating the contact 179 of the relay 5H to cut off the steady energization of the transmitter relay 6CTP and connect this transmitter relay to coding contacts through the back contact 177 of the track repeater relay 6TP.

This same operation is repeated at the other intermediate signal location in Fig. 5B, thereby feeding the high 180 code rate in the end track section 1—4T, the distant relay 3D being energized in response to the 120 code in the track section 3—6T, as well as the relay 3H. This causes coding operation of the track relays 1TR at the siding end A to energize the home relay 1H and the distant relay 1DX and allow clearing of the head-block signal 1 or 1A.

The reception of the 180 code at the siding end A (Fig. 5A) energizes the decoding relay 1DX and through its front contact 181 also causes energization of its slow release repeater relay 1DXP; and with the signal clearing relay ARD energized, as in the case assumed, the clear-out relay 1CO is energized by a pick-up circuit from (+), through front contact 182 of relay ARD, front contact 183 of relay 1DXP, relay 1CO, and back contact 184 of relay 1SD (—). This energization of the relay 1CO closes its front contact 185 to provide a stick circuit to maintain this relay energized until the shut-down relay 1SD is subsequently energized to open its back contact 184. When the east-bound train for which the head-block signal 1 or 1A was cleared enters the detector track section AT, signal clearing relay ARD is automatically released in the regular way, but at the same time the front contact 187 of the detector track relay ATR is opened to break the pick-up circuit for the shut-down relay 1SD otherwise closed from (+) through back contact 186 of relay ARD, front contact 187 of relay ATR, front contact 188 of relay 1DXP, front contact 189 of relay 1DX, front contact 190 of relay 1CO, relay 1SD to (—). When the east-bound train in question advances into the end track section 1—4T, the decoding relay 1DX drops and provides at its front contact 189 another break in the pick-up circuit for the relay 1SD before the train gets out of the detector track section and allows the front contact 187 of the detector track relay ATR to close.

When the east-bound train under consideration enters the end track section 1—4T, it causes energization of the series relay 4SR in Fig. 5B and closes its front contact 192 to energize its slow release repeater relay 4SRP to close a contact 193 to approach light the signal 3. In this modified arrangement of Fig. 5B, the series relay 4SR is not held up by a stick circuit as in the arrangement of Fig. 1B, and being a quick-acting relay, it tends to follow the code; but its repeater relay 4SRP is sufficiently slow releasing to hold over the off intervals of the code and maintain its front contact 193 steadily closed to approach light the signal 3.

When the east-bound train in question passes the intermediate signal 3 in Fig. 5B and stops coding operation of the track relay 3TR, the track repeater relay 3TP drops and closes at its back contact 196 a pick-up circuit for the directional stick relay 3S from (+), through front contact 194 of relay 3H, front contact 195 of relay 4SRP, back contact 196 of relay 3TP, relay 3S, and back contact 197 of the opposing directional stick relay 4S to (—). In this connection, the track repeater relay 3TP is arranged to have a release time less than that of the home relay 3H, say .6 second as compared with 1.5 seconds. When the home relay 3H is deenergized, it establishes through its back contact 194 a stick circuit for the directional stick relay 3S readily traced through its front contact 198, the relay 3S being made sufficiently slow release to hold up during the movement of the contact finger 194 of the relay 3H from its front to back contact.

Thus, when the east-bound train passes the signal 3, the directional stick relay 3S is energized, and is maintained energized so long as the train occupies the track section 3—6T in advance of the signal 3. With the directional stick relay 3S energized, the transmitter relay 4CTP is connected to coding contacts operating at the caution 75 code rate through the back contact 179 of the home relay 3H and front contact 178 of the relay 3S, thereby providing a caution code in the rear of the signal 3 for any following train movement that may be desired.

It may be pointed out here that the directional stick relay 3S is not energized by cessation of coding in the track section 3—6T in advance of the signal 3, due to a shut-down pulse, reversal in the direction of coding in this track section, or by opening an outlying switch, because under these conditions series relay 4SR and its repeater relay 4SRP would not be energized. In other words, the directional stick relay 3S is energized only if a train is present to cause energization of the series relay 4SR.

The system operates in the same manner when the east-bound train in question passes the next intermediate signal 5 to leave a caution code in the track section 3—6T behind this signal, which picks up the home relay 3H and releases the directional stick relay 3S and applies a proceed code of the 120 code rate to the end track section 1—4T, the distant relay 3D not being energized by the caution code received at the signal 3.

When the east-bound train leaves the single track stretch and passes out of the detector track section BT, assuming of course, that an entering signal 7 or 7A has been cleared, the caution code transmitted to the intermediate signal 5 releases its directional stick relay 5S, transmits a code at the proceed 120 rate to the signal 3, thereby energizing the distant relay 3D and causing the high 180 code rate to be transmitted to the siding A. This high 180 code rate received at the siding end A (Fig. 5A) energizes relays 1DX and 1DXP, and assuming that the operator has not in the meantime caused energization of the signal clearing relay ARD for the purpose of clearing the head-block signal 1 or 1A for some following train which has not yet passed these signals, the shut-down relay 1SD is energized by its pick-up circuit above traced, and establishes a stick circuit through its front contact 191 to maintain it energized until the relay 1DXP is deenergized. The energization of the shut-down relay 1SD opens its back contact 184 to restore the clear-out relay 1CO, and closes its front contact 200 to energize the transmitter relay 1CTP directly over a circuit readily traced on the drawings through the back contact 16 of the relay 1CS. This energization of the relay 1CTP disconnects the track relay 1TR from the track rails and after a time the relay 1DXP drops to release the shut-down relay 1SD and in turn drop transmitter relay 1CTP. In this way, a prolonged shut-down pulse is applied to the track rails at the siding end A for a time measured by the release time of the relay 1DX and its repeater relay 1DXP.

This prolonged shut-down pulse acts to overpower the then existing coding in the track sections in substantially the same way as the application of opposing code pulses causes code reversal in the normally coding form of the invention shown in Figs. 1A to 1D previously explained, the track repeater relays 4TP, 6TP being energized in succession to cause energization of the track relay 8TR and open the stick circuit to the code sending relay 8CS and stop transmission of the driven code. The circuit for relaying the shut-down pulse past the intermediate signal 3 in Fig. 5B upon energization of the track relay 4TR and its repeater relay 4TP may be traced from (+) through front contact 177, of relay 4TP, back contact 178 of relay 4S, back contact 179 of relay 4H, transmitter relay 3CTP to (—). It can be seen that the track repeater relays 4TP and 6TP released successively in cascade fashion when the shut-down relay 1SD drops and releases the transmitter relay 1CTP to terminate the shut-down pulse; and consequently the prolonged energization constituting the shut-down pulse does not have to continue until the track relay 8TR at the remote end of the stretch is energized, but only long enough to assure propagation of a shut-down pulse of sufficient duration to assure reliable release of the code sending relay 8CS.

From this explanation, it can be readily understood how the system can be set into operation for an east-bound train movement through the stretch, and then automatically shuts down after this movement has been made, providing the operator has not energized the signal clearing relay ARD for a subsequent east-bound train movement. The operation for west-bound train movements is substantially the same and need not be discussed in detail.

Considering now the operation of the modification of Figs. 5A to 5B in the case of a back-up train movement assume, for example, that the operator clears the head-block signal 1 or 1A for an east-bound train to enter the stretch, and then later causes energization of the signal clearing relay ALD for the purpose of clearing the intermediate signals 4 to allow this train to make a back-up movement. When the signal clearing relay ALD is energized and closes its front contact 304, the code sending relay 1CS is energized and applies code pulses to the west end of the end track section 1—4T; and these code pulses act when the train has passed out of this track section during the first off intervals of the west code pulses in this track section to cause energization of the track relay 4TR and its repeater relay 4TP in Fig. 5B, thereby cutting off further transmission of code pulses west and allowing the track relay 4TR to be operated without interference at the code rate appropriate for giving the signal 4 a caution or clear indication as the case may be. With the train in the track section 3—6T in advance of signal 3, there is no coding operation of the track relay 3TR, and the home relay 3H is deenergized, so that the home relay 4H may be picked up by the coding operation of the track relay 4TR, and perhaps also the distant relay 4D to control the signal 4 to display the proper indication. Also, the energization of the home relay 4H and closing of its front contact 179 connects the transmitter relay 3CTP to the 120 coding contacts, and allows energization of the series relay 3SR with the train present to approach light the signal 4. The directional stick relay 3S is maintained energized by its stick circuit.

When the train in question reverses its direction of movement and passes signal 4, coding operation of the track relay 4TR ceases, and relays 4TP and 4H release in succession; but although relay 3SRP is energized at this time, the directional relay 4S is not energized, because its pick-up circuit is open at the back contact 197 of the other directional stick relay 3S still held up by its stick circuit; and since the relay 3H cannot pick up to drop the directional stick relay 3S until the relay 4H has dropped and closed its back contact 189, it is assured that the opposing directional relay will not be energized under these conditions. Consequently, when the train in question passes out of the track section 3—6T in the rear of signal 4, coding west in this track section 3—6T first established by the energization of the code sending relay 8CS for the east-bound train making the back-up move to enter this stretch, is again established, picking up the signal control relays 3H and 3D to provide its code pulses in the end track section 1—4T under the train in question toward the siding end A. In other words, in this modified organization of control circuits for the intermediate signals, the direction of coding is not reversed when a train makes a back-up move, but is left in the same direction for which it was established for the train to enter the stretch.

In the case of a back-up train movement, the system is restored to its normal or inactive shut-down condition in much the same way as in the case of an east-bound train movement through the stretch. Assuming a back-up movement for an east-bound train as just described, when the signal clearing relay ARD is energized to clear a head-block signal 1 or 1A for such train to enter the stretch the clear-out relay 1CO is energized when the high 180 code rate is received at the siding end A; and when the train in making its back-up move has cleared the single track stretch and passed out of the detector track section AT, the shut-down relay 1SD is energized to produce a shut-down pulse in the same manner previously discussed, thereby releasing the coding relay 8CS and restoring the system to its normal inactive condition, assuming, of course, that the operator has not in the meantime energized the clear-out relay ARD for some other train movement.

If the operator should energize the signal clearing relay ALD to clear the intermediate signal 4 for a back-up move and then manually restore this relay ALD to its normal deenergized condition, the code sending relay 1CS would be held energized by its stick circuit, and maintain coding east in the end track section 1—4T, keeping the track repeater relay 4TP in Fig. 5B energized to prevent transmission of any code pulses west in this end track section to clear a head-block signal 1 or 1A. Consequently, after the operator has cleared an intermediate signal such as the signal 4 for a train to make a back-up movement, he cannot manually take away this control and clear a head-block signal 1 or 1A for an opposing train movement. Also, if the operator has once cleared the head-block signal 1 or 1A and then puts this signal to stop, the front contact 14 of the lock stick relay 1LS acts in the manner previously discussed to prevent for a time transmission of a code to clear the opposing intermediate signal 4, even if the operator should for some reason energize the signal clear relay ALD and pick up the relay 1CS.

It may be explained here that if the operator should accidentally or carelessly cause energization of the signal clearing relay ALD after an east-bound train has entered the single track stretch, and when no back-up movement is to be made by this train, the code sending relay 1CS, which remains energized even after this relay ALD is manually restored to correct the error, creates code pulses overpowering the code pulses that would otherwise be left behind such east-bound train and ultimately causes release of the code sending relay 8CS when the east-bound train leaves the stretch. Under these conditions, no shut-down pulse is sent back to the siding end A to cause an automatic shut-down operation of the system, and the track circuits of the single track stretch continue coding operation in a direction suitable for west-bound train movements. The same will be true if coding through the single track stretch is set up under normal conditions by energization of the relay ALD or the corresponding relay BRD as a result of careless manipulation on the part of the operator at a time when no train movement is to be made. In other words, when coding through the single track stretch is established by energization of the signal clearing relays ALD or BRD for a train movement that does not actually occur, the system does not assume its normally shut-down condition after such faulty manipulation, because under such conditions neither of the clearout relays 1CO and 8CO are energized. Under such remote circumstances, coding operation of the track circuits of the single track stretch is maintained until some subsequent supervisory manual control occurs and acts in the same way as in the normally coding form of the invention shown in Figs. 1A and 1B to utilize the existing direction of coding, or cause code reversal for a train to enter the stretch. In short, while the system acts to automatically shut-down for normal train movements and proper manipulation on the part of the operator, if such shut-down operation does not occur under special or exceptional conditions such as mentioned above, the proper direction of coding may be subsequently established for any desired train movement in the same manner described for the normally coding embodiment of the invention shown in Figs. 1A and 1B.

In the case of a train movement off of an outlying switch such as indicated by dash lines in Fig. 5B, after the train crew has called up over the telephone and before the operator gives permission for the train to come out, he causes energization of the signal clearing relay ALD or BRD to establish the direction of coding required for the desired movement of this train on the outlying switch. Assuming that this direction of coding is west for the train on the outlying switch to move east, the 180 code rate is transmitted to the siding end A, but since the clear-out relay 1CO has not been energized, no shut-down operation occurs. When the switch is opened, however, the relay 1DX is deenergized, and the relay 1CO is energized over a circuit through the back contact 181 of the relay 1DX, back contact 182 of the relay ARD, front contact 183 of the relay 1DXP, relay 1CO and back contact 184 of relay 1SD, to (—). Thus, after the switch has been opened, the system is conditioned to provide a shut-down control in the same manner previously explained, when the stretch becomes unoccupied, or if the switch is restored to normal position for some reason without any train movement into the stretch.

With regard to occupancy indications for the single track stretches, it is contemplated that the same method for giving occupancy indications shown in Figs. 1A–1D and previously explained will be employed in connection with the shut-down modification of Figs. 5A to 5D, with the difference that the pick-up circuit for the indication control relay ATK, for example in Fig. 5A includes a back contact 201 of the shut-down relay 1SD, as well as the back contact 154 of the relay 1CS, and also a storage relay 1DXK is provided for the relay 1DXP. The purpose of this back contact 201 of the relay 1SD is to prevent the improper energization of the relay ATK and transmission of an occupancy indication when the relay 1DX is dropped as a result of the energization of the relay 1SD to apply the shut-down pulse.

Regarding the storage relay 1DXK, it will be remembered from the explanation of the operation in connection with Figs. 1A and 1D that the cancellation of the occupancy indication is accomplished by the transmission of an indication over the channel *b* when the stretch becomes vacant and the relay 1DXP is energized. In the normally shut-down form of the invention, shown in Fig. 5A, the energization of the relay 1DXP is immediately followed by the energization of the relays 1SD and 1CTP to again deenergize this relay 1DXP after a time. Although the energization of the relay 1DXP immediately opens the start circuit at its contact 159 to initiate operation of the coding equipment of the corresponding field station to transmit an indication to the control office, it may well happen in the multiple station type of code C. T. C. contemplated that this field station will not get a chance to send an indication during the relatively short time the relay 1DXP is energized. Consequently, in this normally shut-down arrangement, the storage relay 1DXK is provided to store the temporary energization of the relay 1DXP when the stretch becomes vacant, until an indication of this fact has actually been transmitted in the control office. It can be readily seen that this storage relay 1DXK is energized through front contact 203 of the relay 1DXP by an obvious circuit, and is held up until the indication code is actually transmitted by a stick circuit through its front contact 204, back contact 226 of relay ATK, the back contacts 156 and 157 in multiple of the relays LV and LO in a similar way that the relay ATK is controlled.

With the variations and additions just explained, the organization shown in Figs. 5A and 5B acts to provide occupancy indications in the same manner previously discussed. For example, whenever an east-bound train enters the stretch, or the outlying switch is thrown with coding west, the relay ATK is energized to transmit an indication to energize the relay AK in Fig. 3 and light the occupancy lamp 168, and when the stretch becomes vacant and the 180 code is received at the same siding end A, or at the opposite siding end B, the corresponding storage relay 1DXK or 8DXK is energized to transmit in due time over the corresponding channel *b* an indication energizing the clear-out relay CLO and release the relay AK to extinguish the occupancy lamp 168.

*Shut-down control for the siding sections.*—In the embodiment of the invention shown in Figs. 5A and 5B, in order to accomplish the starting and shut-down features, provision is made for initiating coding in the siding section at either end by the transmission of a start pulse from the other end whenever a C. T. C. control is received at that end to cause clearing of the corresponding entering signal over the switch in normal position; and after coding in the siding section is no longer needed for clearing such an entering signal, provision is made to transmit a shut-down pulse over the track rails in opposition to the existing direction of coding to stop further code transmission. In other words, as diagrammatically indicated in Fig. 5A, a single pulse acts to energize and hold up a code sending relay to initiate coding from the end of the siding section receiving that pulse; but two pulses in succession, either a start pulse later followed by a shut-down pulse, or the two succeeding pulses of normal code transmission, act to deenergize the code sending relay.

Figure 5D:
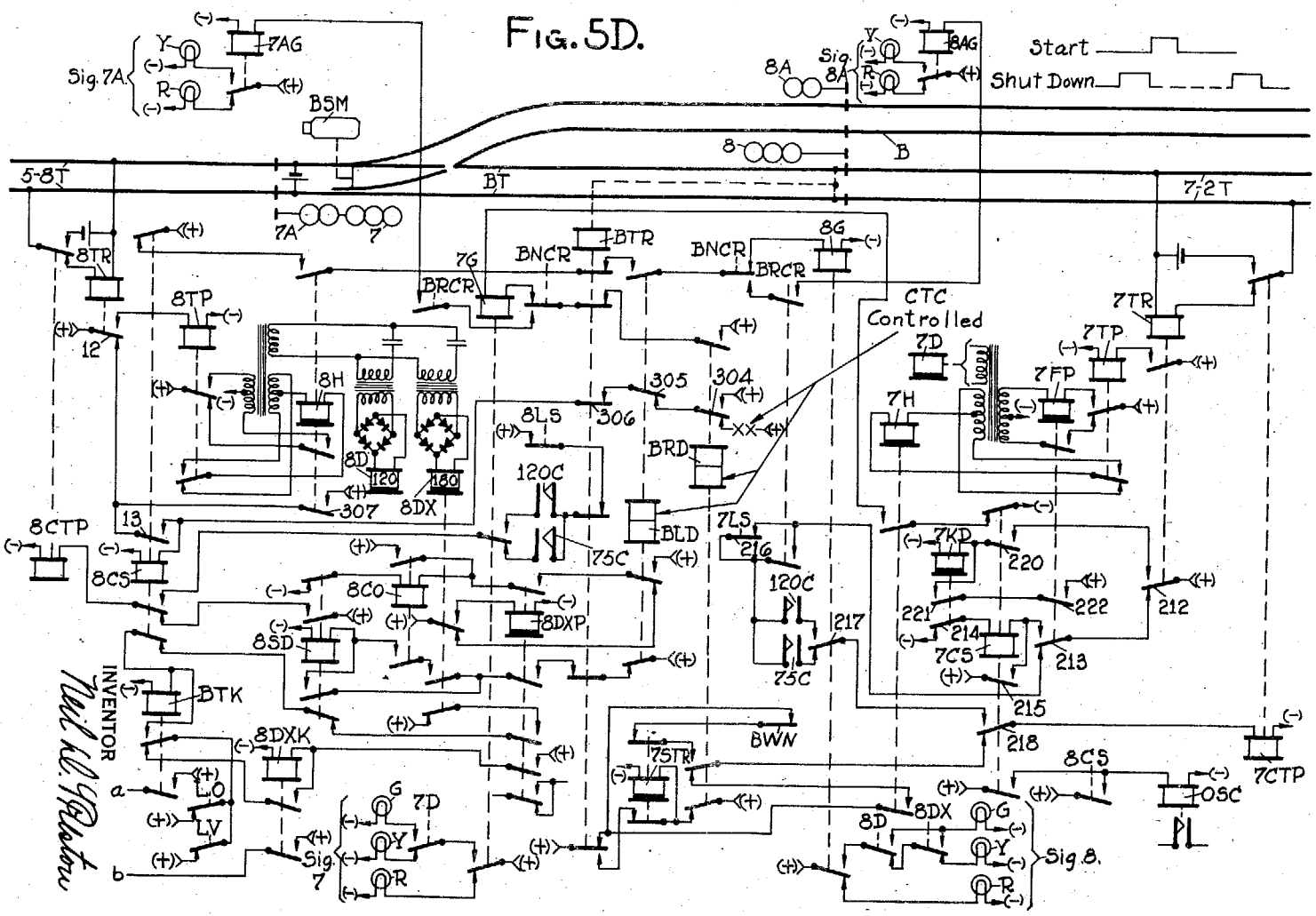

Referring to Figs. 5D and 5A arranged end to end to illustrate the apparatus for a siding section, and assuming that the operator desires to clear the entering signal 2 in Fig. 5A for train movement over the corresponding track switch in the normal position into or through the siding section, the energization of the signal clearing relay ALD by C. T. C. control closes a circuit for energizing the transmitter relay 2CTP, which may be traced from (+), through front contact 205 of the detector track relay ATR, front contact 206 of the normal switch control relay AWN, front contact 207 of a slow release start relay 2STR, front contact 208 of relay ALD, back contact 209 of code sending relay 2CS, transmitter relay 2CTP, to (—).

This energization of the transmitter relay 2CTP gives a start pulse which is terminated when the slow release relay 2STR drops, this relay being deenergized when the relay ALD picks up and opens its back contact 210.

This start pulse energizes the track relay 7TR at the other end of the siding section (see Fig. 5D) to pick up its quick acting repeater relay 7TP and in turn a slow release front contact repeater relay 7FP in series with the upper half of the decoding transformer; and when this start pulse ceases and the track relay 7TR drops, the code sending relay 7CS is energized by a pick-up circuit from (+), through back contact 212 of track relay 7TR, front contact 213 of the repeater relay 7FP, relay 7CS, and back contact 214 of relay 7KD to (—). The code sending relay 7CS is maintained energized by a stick circuit through its front contact 215 and the back contact 214 of the knock-down relay 7KD.

With the code sending relay 7CS energized, and when the repeater relay 7FP drops, a coding circuit for the transmitter relay 7CTP is established from (+), through back contact 212 of track relay 7TR, back contact 213 of its repeater relay 7FP, front contact 216 of relay 7LS, coding contacts 75C or 120C, front or back contacts 217 of the signal lever 8G, front contact 218 of relay 7CS, transmitter relay 7CTP, to (—).

In this way, coding is set up east in the siding section to clear the signal 2. It may be explained here why these code impulses, although having the character of start pulses, do not initiate coding in the opposite direction. The first impulse of the signal clearing code acts the same as a start pulse to energize the code sending relay 2CS in Fig. 5A; but the second impulse acts to energize the knock-down relay 2KD through a circuit readily traced through front contact 212 of track relay 2TR and front contact 220 of relay 2CS. The relay 2KD is stuck up through its front contact 221 and a front contact 222 of the repeater relay 2FP, and opens its back contact 214 to open the pick-up and stick circuits for the relay 2CS, thereby dropping this relay 2CS and preventing its energization until coding ceases and the relay 2FP assumes its normal deenergized condition, whereupon relay 2KD is restored to its normal condition. In this connection it should be understood that the relay 2FP is arranged to close its contacts in response to the first pulse of a code and is sufficiently slow releasing to maintain its contacts closed during the off intervals in normal code transmission. Although the relay 2CS is thus energized by the first pulse of a signal clearing code, there is no opposing pulse, since the coding circuit for the transmitter repeater 2CTP, like the circuit above traced for the transmitter 7CTP, includes a back contact 213 of the slow release repeater relay 2FP, which does not close between the first and second pulses of the signal clearing code.

When the west-bound train for which the signal 2 was cleared has passed through the siding section, and assuming that the operator has not in the meantime energized the relay ALD for some following train movement, the coding operation of the track relay 2TR is resumed to energize relay 2H (Fig. 5A), and the transmitter relay 2CTP is energized during the release time of this relay 2H to provide a shut-down pulse by a circuit which may be traced from (+), through front contact 205 of the detector track relay ATR, front contact 224 of relay 2H, back contact 208 of relay ALD, back contact 209 of relay 2CS, transmitter relay 2CTP to (—). This shut-down pulse acts to pick up the track relay 7TR at the other end of the siding section (Fig. 5D); and since the code sending relay 7CS is energized at this time, the knock-down relay 7KD is energized through front contact 212 of track relay 7TR and front contact 220 of relay 7CS, opening back contact 214 to drop the code sending relay 7CS. As long as this shut-down pulse continues, the repeater relay 7FP holds up the relay 7KD by its stick circuit through front contact 222 of relay 7FP and front contact 221 of relay 7KD, thereby preventing energization of the relay 7CS when the start pulse ceases and drops relay 7TR, 7FP and 7KD in turn.

It will be noted that the energizing circuit for the transmitter relay 2CTP providing the shut-down pulse includes a front contact 205 of the detector track relay ATR. This front contact 205 keeps the shut-down circuit open when a west-bound train for which the signal 2 is cleared enters the detector track section and drops the relay ALD in the usual way; and when this train passes into the siding section, it drops the relay 2H to open at its front contact 224 the shut-down circuit at another point before the train leaves the detector track section and the front contact 205 of the track relay ATR is again closed. This avoids a premature shut-down when the west-bound train first enters the detector track section, and maintains coding in the siding section until the train has passed through that section, so that the operator may energize the relay ALD for some following train movement while the siding section is occupied and the entering signal will clear as soon as the siding section becomes vacated. Otherwise, if the coding was shut-down before the first train had passed through the siding section, the operator would have to wait until the section became vacated before manually energizing the relay ALD to send a start pulse over the track rails that would be effective.

If the operator should clear the entering signal 2A for a west-bound train to enter the siding, the starting circuit is opened at the front contact 206 of the normal switch control relay AWN, so that no start pulse is transmitted to initiate coding in the siding section and interfere with initiating of coding in the other direction to clear the entering signal 7 for some other train to move into the siding section, as in the case of a meet.

If the operator should clear the entering signal 2 prematurely or by mistake, the shut-down control acts to stop the coding in the siding section when he manually restores the signal clearing relay ALD to its deenergized condition, in the same way as if this relay were deenergized by a passing train. Under such conditions, however, the operator should not be able to clear the opposing signal 7 at once for the same reasons previously discussed; and although the shut-down is immediately effective and the code sending relay 2CS may be energized by a start pulse from the other end, the actual transmission of code pulses west to clear the entering signal 7 is delayed until the lock stick relay 2LS is restored after the usual release time to close at its front contact 216 the coding circuit for the transmitter relay 2CTP. Since the transmission of code pulses west in the siding section is proper when the entering signal 2A is cleared for a train movement into the siding, and the circuits as shown in Fig. 4 cause deenergization of the lock stick relay 2LS when the signal 2A is cleared, the front contact 216 of this relay 2LS is shunted by a front contact 219 of the reverse correspondence relay ARCR.

When the operator has cleared the entering signal 2 for a west-bound train movement into the siding section, coding in this siding section cannot be interfered with to put this signal 2 to stop by any accidental or careless attempt on the part of the operator to clear the opposing entering signal 7 by the energization of the relay BRD because the code sending relay 7CS is releasable only by a shut-down pulse from the other end of the siding section. Also, the energization of the relay BRD under these conditions does not send a start pulse that might mutilate the signal clearing code pulses being transmitted since the start circuit for energizing the transmitter relay 7CTP, analogous to that above traced for the transmitter relay 2CTP, is open at the back contact 218 of the code sending relay 7CS then energized.

In the type of C. T. C. system assumed, the signal clearing relays such as ALD may be energized by supervisory manual control at any time, and even while the corresponding detector track section is occupied, except of course for the interlock with the associated signal clearing relay such as ARD for the other direction of train movement. While this facilitates manipulation of the signal levers by the operator to precondition signals for clearing under certain operating conditions, it also allows him to energize the relay ALD for example at a time when a start pulse cannot be transmitted; and in order that this start pulse may not be lost, so to speak, the start relay 2STR is preferably provided with a stick circuit through its front contact 225 and the back contact 205 of the track relay ATR, so that the start pulse becomes effective as soon as operating conditions permit. Suppose, for example, that the operator wishes to send one west-bound train into the siding and another following train into the siding section, and assume that in accordance with the usual manipulation, the operator sends a control code to set the switch normal and again energize the relay ALD while the first train is in the detector track section. The front contact 205 of the detector track relay ATR has the start circuit open for reasons previously discussed; but the start relay 2STR is held up by its stick circuit under these conditions and until the first train in question leaves the detector track section, whereupon the start pulse is transmitted to initiate coding for clearing the signal 2 for the following train in question.

The mode of operation of the system for setting up and shutting down track circuit coding in the siding section for east-bound train movements is analogous to that described for west-bound train movements, and need not be discussed in detail.

It can be seen that in the various embodiments of the invention shown, code pulses at a rate corresponding with the indication of the signal next in advance are transmitted over the track rails toward a train in each track section of the single track stretches and siding sections; and these code pulses, with superimposed alternating current if desired, may be employed to control cab signals in accordance with recognized practice.

Among the various features of this invention, it may be noted that provision is made to prevent clearing of opposing signals at the same time. When the head-block signal 1 or 1A, for example, is cleared by coding in the direction shown, it is assured that no driven code pulses are being transmitted over the end track section 1—4T in the opposite direction to operate track relay 4TR and clear signal 4, otherwise the track relay 4TR and its repeater relay 4TP would be energized to open the circuit for the transmitter relay 4CTP, thereby preventing transmission of any code to clear the signal 1 or 1A. Similarly, there can be no code pulses to clear the opposing intermediate signal 6 under these conditions, otherwise the track relay 6TR and its repeater relay 6TP would be energized and there would be no code pulses transmitted west in the track section 3—6T to provide in turn code pulses in the track section to clear the signal 1 or 1A. Likewise, if there is coding west in the remote end track section 5—8T to provide coding in the other track sections to clear signal 1 or 1A, the energization of the track relay 5TR and its repeater relay 5TP by such code would prevent energization of transmitter relay 5CTP and transmission of opposing code pulses to clear an opposing head-block signal 8 or 8A.

With regard to the siding section, in the arrangement illustrated in Figs. 5A and 5B, transmission of code pulses in either direction acts to lock out transmission of code pulses in the opposite direction; and in the arrangement shown in Figs. 1A and 1B, the code reversing relay CR must be deenergized for transmission of code pulses in the siding section in a direction to clear the signal 7 or 7A and the open front contact 140 of the relay CR prevents clearing of signal 2 or 2A, while if this relay CR is energized to clear signal 2 or 2A, the back contact 38 of this relay CR prevents transmission of code pulses in the opposite direction to clear signal 7 or 7A.

In connection with the operation of overpowering the existing direction of coding in the single track stretch, a back contact of the track relay at each intermediate signal is included in the energizing circuit for the corresponding transmitter relay. This assures that an opposing code pulse acting during the first "off" period of the existing code is effective for its full "on" period, and is not shortened or mutilated by any earlier closure of the coding contacts providing such existing code. For example, referring to Figs. 1A and 1B and assuming coding west in the end track section 1—4T as shown, after energization of the transmitter relay 1CTP and during the first "off" period of this existing code, the track relay 4TR is energized and opens at its back contact the deenergizing circuit for the transmitter relay 4CTP, thereby preventing any energization of this transmitter relay 4CTP regardless of the closure of its associated coding contacts until track relay 4TR is again deenergized. This back contact check or interlock between the transmitted and received code pulses is useful in any situation where opposing codes exist in a track section for the purpose of assuring that code pulses will be received at the transmitting end of the track section for the full "on" period without mutilation.

In the system of the character described, where code pulses are sometimes transmitted and sometimes received at the same end of a given track section, and a transmitter relay acts to connect a track battery and a track relay across the track rails alternately, it may happen that a stray potential of the proper intensity and polarity to operate the track relay may exist while the transmitter relay is operating; and under such conditions it can be seen that the track relay is intermittently connected to the stray potential and may be falsely coded at the code rate of the transmitter relay. In this connection, the lock-out effect of the back contact of the track relay in the energizing circuit for the associated transmitter relay protects against such false coding operation of the track relay by a stray current for the same reasons and in the same manner disclosed and claimed in my prior application Ser. No. 365,065, filed November 9, 1940. While in the arrangement shown such back contact check is not associated with the track relays 1TR and 8TR for the ends of the single track stretch, any false coding of the track relay 1TR, for example, due to a stray potential cannot clear signal 1 or 1A because coding operation of the transmitter relay 1CTP cannot occur unless relay 1CS is energized, and under such conditions the back contact 91 of this relay prevents clearing of the signal 1 or 1A. Similarly, with regard to the siding section, if the code reversing relay CR (see Fig. 1A) is energized to close its front contact 140 and permit clearing of signal 2 or 2A by coding operation of the track relay 2TR, the back contact 38 of the relay CR prevents any coding operation of the transmitter relay 2CTP; and similarly if the track repeater relay 7TP is energized (Fig. 1D) to permit clearing of signal 7 or 7A, the operation of the transmitter relay 7CTP by coding contacts is prevented.

It is contemplated that the track relays will be of the biased polarized type responsive to one polarity only and the polarities of the track batteries and the polarities to which the track relays will respond are so chosen that a track relay is not responsive to the polarity supplied to the adjacent end of the adjoining track section on the other side of the insulated joints, so as to afford protection against a breakdown of the insulated joints in accordance with known practice. The relative polarities of the track batteries at opposite ends of the same track section are preferably the same so as to avoid excess current in the track circuit when these track batteries are both connected to the track rails, which momentarily occurs when an opposing code or shut-down pulse is first applied at one end of the track section at a time when code pulses are being transmitted from the opposite end. With such an arrangement, each track relay is responsive to its own track battery, so that a faulty condition of the front and back contacts of the transmitter may momentarily connect the track relay with its associated battery and tend to produce a false coding operation; but with the back contact of this track relay included in the energizing circuit for such transmitter relay, it can be seen that the transmitter relay will be vibrated intermittently under such faulty conditions at a relatively high code rate and without creating any unsafe condition.

It should be understood that the various features and functions of the different embodiments of the invention shown and described may be employed in different combinations. For example, either of the different organizations for the control of the intermediate signals shown in Figs. 1B and 5B may be used with either organization for governing the head-block signals, or with either arrangement of circuits for the siding section, which have been shown in the two different forms of normally coding and normally shut-down embodiments of the invention disclosed. Also, the particular organization of circuits shown and described for performing the various control functions may be supplemented or modified in various ways without departing from the operating characters of the invention; and I desire to have it understood that the invention is not limited to the specific organizations and arrangements of parts and circuits shown and described.

What I claim is:

1. In a coded track circuit system for railroads, the combination with a stretch of track having a signal at each end governing train movement into the stretch, means for each signal including a code following track relay connected across the track rails for governing the indications of that signal, code transmitting means for each end of the stretch operable to apply to the track rails driven code pulses for operating the track relay at the opposite end of the stretch, means for rendering each of said code transmitting means ineffective by the energization of the track relay for the corresponding end of the stretch, and manually controlled means for initiating operation of said code transmitting means at either selected end of the stretch for a time in spite of the coding operation of the corresponding track relay, whereby the direction of coding in the stretch may be reversed by applying driven code pulses at either end.

2. In a coded track circuit signaling system for a stretch of track divided into a plurality of track sections, a code following track relay for each end of each track section, code transmitting means for each end of each track section operable only if the track relay for the corresponding end of that track section remains deenergized, each of said code transmitting means except those for the extreme ends of said stretch being set into operation in response to the coding operation of the track relay for the adjoining end of the adjacent track section and means manually controlled from a distant control office for initiating operation of the code transmitting means at either selected end of said stretch for a time until after the track relay at the corresponding end of the stretch becomes deenergized and thereby establish a direction of coding in a corresponding direction over the successive track sections.

3. In a coded track circuit system of centralized traffic control for a stretch of track divided into a plurality of track sections and having signals at intervals for governing train movement into and through said stretch in opposite directions, means for each track section responsive to the transmission of code pulses in either direction over the track rails thereof for stopping transmission of code pulses in the opposite direction and for also initiating code transmission in a corresponding direction in any adjacent track section, code responsive means for governing the indications of each signal in response to the code pulses received at that signal over the track rails of the associated track section and means manually controlled from a distant control office for initiating transmission of driven code pulses from either selected end of the stretch and for governing the clearing of the corresponding signal at that end.

4. In a coded track circuit system of centralized traffic control for a stretch of track having a signal at each end governing train movement into said stretch, means for each end of said stretch including a code following track relay for governing the indications of the corresponding signal, code transmitting means for each end of said stretch, means manually controlled from a distant control office for initiating operation of said code transmitting means at either selected end of the stretch, said code transmitting means at the end having its operation last initiated by such manual control continuing in operation to provide driven code pulses over the track rails of the stretch in the corresponding direction until the associated track relay is energized by some opposing pulse, and means manually controlled from said control office for conditioning either selected signal to clear in response to the coding operation of the corresponding track relay only if the associated code transmitting means is inactive.

5. In a coded track circuit signaling system for a stretch of single track divided into track sections having signals at the ends of said track sections for governing train movement into and through the stretch in both directions, a code following track relay and code transmitting means for each end of each track section, means associated with each track relay and responsive to its energization for rendering in effective the corresponding code transmitting means and also except in the case of the code transmitting means for the extreme ends of the stretch for initiating operation of the code transmitting means for the adjoining end of the adjacent track section, code responsive means for governing the indications of each signal in accordance with the code received at that signal over the track rails of the associated track section, and means manually controlled from a distant control office for initiating operation of the code transmitting means at either selected end of said stretch for a time independently of energization of the corresponding track relay, said means also conditioning the signal for the opposite end of the stretch to clear subject to the reception of code pulses, whereby an existing direction of coding in the several track sections may be stopped and coding established in the opposite direction over the successive track sections of the stretch insofar as they are not occupied by manually initiating coding operation at the end of the stretch then receiving code pulses.

6. In a coded track circuit signaling system of centralized traffic control for a stretch of track divided into track sections and having a signal at the entrance end of each track section governing train movement into and through said stretch, code transmitting means for each end of each track section operable to transmit driven code pulses over the track rails of that track section toward the opposite end, code-responsive means including a code following track relay for governing the indications of each signal, each of said code-responsive means except those for the signals at the ends of the stretch acting in response to the coding operation of its associated track relay to govern the operation of the code transmitting means for the adjacent track section and thereby provide driven code pulses for governing the indications of the next signal in the rear governing train movement in the same direction, each of said code-responsive means also acting in response to the energization of the associated track relay to render ineffective the associated code transmitting means, and means manually controlled from a distant control office for initiating operation of the code transmitting means at either selected end of the stretch for a time independently of energization of the corresponding track relay, whereby the direction of coding in the successive track sections may be established by manual control acting over the track rails and effective insofar as the track sections are not occupied by a train.

7. In a coded track circuit signaling system for a stretch of single track between the ends of passing sidings divided into track sections and having signals at the ends and at intermediate points for governing train movement into and through the stretch, a code following track relay for each end of each track section, code-responsive means for governing the indications of each signal in response to the coding operation of the associated track relay, code transmitting means for each end of each track section operable to transmit driven code pulses over the track rails of that track section for operating the track relay at the opposite end, means associated with each track relay except those for the ends of the stretch and responsive to its energization for rendering ineffective the code transmitting means for the corresponding end of that track section, and for initiating operation of the code transmitting means for the adjoining end of the adjacent track section, a code sending stick relay for each end of the stretch having stick circuit means for maintaining said relay energized until the corresponding track relay is once energized after being deenergized for a time, and means manually controlled from a distant control office for energizing the code sending relay at either selected end of the stretch and thereby initiate transmission of code pulses from that end to reverse the direction of coding in the successive track sections and release the code sending relay at the opposite end if the stretch is not occupied.

8. In a coded track circuit system of centralized traffic control of the character described, a stretch of track having a signal at each end governing train movement into the stretch, a code following track relay at each end of the stretch, code transmitting means for each end of the stretch including a code sending stick relay and operable only while said code sending relay is energized to apply driven code pulses to the track rails at the corresponding end of the stretch, a stick circuit for each code sending relay opened when the associated track relay is energized, another stick circuit for each code sending relay closed in response to intermittent coding operation of the associated track relay and for a predetermined time after the cessation of the coding operation of such track relay, and manually controlled means for temporarily energizing said code sending relay at either selected end of the stretch.

9. In a coded track circuit system of the character described for a stretch of track having a code following track relay at each end, code transmitting means for each end of said stretch including code sending means and operable only while said code sending means is effective to apply driven code pulses to the track rails at the corresponding end of the stretch, manually controlled means for rendering effective said code sending means at either selected end of the stretch in spite of the then existing coding operation of the corresponding track relay by driven code pulses being received, each of said code sending means when rendered effective remaining effective until restored and means for restoring each of said code sending means when the corresponding track relay is energized after its coding operation has ceased for a time.

10. In a coded track circuit system of centralized traffic control for a stretch of single track between the ends of passing sidings divided into track sections; a head-block signal and an entering signal at each end of said stretch governing train movement into and out of said stretch respectively, intermediate signals at intervals in the stretch for governing train movement in opposite directions, code-responsive means including a code following track relay for governing the indications of each of said signals, code transmitting means for each end of each track section for transmitting driven code pulses toward the opposite end, and means manually governed from a distant control office and effective at any time regardless of the presence of a train in the stretch for initiating operation of said code transmitting means to cause transmission of driven code pulses from either selected end of the stretch over the successive track sections insofar as they are not occupied, whereby manual control may be exercised to clear one or more intermediate signals behind a train in the stretch to permit such train to make a back-up movement.

11. In a coded track circuit system of centralized traffic control for a stretch of track divided into track sections and having signals at intervals governing train movement into and through said stretch, code transmitting and code receiving means for each track section, means associated with each intermediate signal of the stretch and responsive to the transmission of code pulses toward that signal for initiating transmission of code pulses in the same direction in the adjacent track section, means associated with each track section and responsive to the transmission of code pulses in a direction opposite to the direction of coding then existing for reversing the direction of coding in that track section, means associated with each signal for governing the indications thereof in response to the coding operation of the associated code receiving means, and means manually controlled from a distant control office for initiating transmission of code pulses from either selected end of the stretch and also governing the clearing of the signal for the opposite end, whereby coding may be established from either end of the stretch over the successive track sections insofar as they are not occupied and thereby permit clearing of a signal for a train to enter the stretch at either end when not occupied and also permit clearing of signals for a train in the stretch to make a back-up movement.

12. In a coded track circuit signaling system for a stretch of single track between the ends of passing sidings divided into track sections, a head-block signal and an entering signal at each end of said stretch governing train movement into and out of said stretch, intermediate signals governing train movement through the stretch in opposite directions, means including a code following track relay for governing the indications of each of said signals, code transmitting means for each end of each track section governed by the coding operation of the track relay for the adjoining end of any adjacent track section and effective only if the corresponding track relay remains deenergized, means manually controlled from a distant control office for controlling the clearing of a head-block signal at either selected end of the stretch and for initiating operation of the code transmitting means at the opposite end of the stretch, and signal clearing means for each entering signal manually controlled from said control office and effective when energized to govern the clearing of that signal and initiate operation of the corresponding code transmitting means to transmit code pulses from the corresponding end of the stretch independently of the operation of the corresponding track relay whereby the direction of coding in the track section or track sections behind a train in the stretch may be reversed to clear an intermediate signal or signals for such train to make a back-up movement by manual clearing control of the corresponding entering signal.

13. In a coded track circuit signaling system of the character described for a stretch of track divided into a plurality of track sections, means including intermittently operated coding contacts and a code transmitter relay associated with each end of each track section and operable to apply driven code pulses to the track rails at the corresponding end of that track section, a code following track relay for each of the adjoining ends of said track sections, a slow-release repeater relay for each of said track relays maintained energized during the coding operation of that track relay, and an energizing circuit for each of the transmitter relays of the adjoining ends of said track sections including a back contact of the associated repeater relay, whereby the coding operation of said track relays renders ineffective the associated code transmitter relay.

14. In a coded track circuit signaling system of the character described for a stretch of track divided into a plurality of track sections, driven code transmitting means including intermittently operated coding contacts and a code transmitter relay associated with each end of each track section, a code following track relay for each of the adjoining ends of said track sections, a slow-release repeater relay for each of said track relays picked up when its corresponding track relay is energized and maintained energized during the coding operation of that track relay, energizing circuits for the transmitter relays of the adjoining ends of said track sections including back contacts of the associated track relay and its repeater relay, and also including contacts governed by the coding operation of the track relay of the adjoining end of the adjacent track section, whereby the coding operation of any given track relay renders ineffective the associated code transmitter relay but causes a driven code to be transmitted in the next adjoining track section, and means responsive to the continued energization of a given track relay for causing the steady energization of the transmitter relay for the adjoining end of the adjacent track section for a limited time.

15. In a coded track circuit signaling system for railroads, the combination with adjoining track sections, signals at the adjacent ends of said track sections governing train movement in opposite directions, means including a code following track relay for governing the indications at each signal, code transmitting means rendered effective in response to the coding operation of the track relay for each signal to apply driven code pulses to the track section in the rear of that signal, means responsive to the energization of the track relay in the rear of a signal receiving code pulses for stopping operation of the corresponding code transmitting means and for initiating operation of a code transmitting means for the other track section, and means manually controlled from a distant control office for transmitting driven code pulses over the track rails from the remote end of either selected one of said track sections until a code pulse is received at that end.

16. In a coded track circuit system of centralized traffic control for a stretch of single track divided into track sections and having a signal at each end governing train movement into the stretch and intermediate signals at the adjoining ends of said track sections governing train movement through the stretch in opposite directions, code transmitting means for each end of each track section, code-responsive means including a code following track relay for governing the indications of each signal, each of said code-responsive means except those for the signals at the ends of the stretch acting in response to the coding operation of its track relay to govern the operation of the code transmitting means for the track section in the rear of that signal and thereby provide driven code pulses to govern the indications of the next signal in the rear, means responsive to the energization of each track relay by reception of a code pulse for rendering ineffective the associated code transmitting means and stop transmission of code pulses from the end of the track section at which that track relay is located, and means manually controlled from a distant control office for initiating operation of said code transmitting means at either selected end of said stretch, for a time independently of the energization of the corresponding track relay.

17. In a coded track circuit signaling system of the character described, the combination with two adjoining track sections, means including a source of current, a code following track relay, and a code transmitter relay for each of the adjacent ends of said track sections, each of said code transmitter relays acting to connect the corresponding source of current and track relay alternately across the track rails upon its energization and deenergization, coding contacts intermittently operated at recurrent intervals, circuit means for each transmitter relay controlled by the coding operation of the track relay for the adjoining end of the adjacent track section for connecting such transmitter relay to its associated coding contacts, means responsive to the energization of each track relay for disconnecting the corresponding transmitter relay from said coding contacts and also energizing the code transmitter relay for the other track section until its associated track relay has been deenergized for a limited time and thereafter connect that other transmitter relay to said coding contacts, and manually controlled means for applying driven code pulses to the extreme ends of either selected one of said track sections only until a code pulse is received at that end.

18. In a coded track circuit system of the character described, the combination with adjoining track sections, a code following track relay and code transmitting means for each of the adjacent ends of said track sections, code sending means manually set into operation for applying driven code pulses to the extreme ends of either selected one of said track sections, each of said manually controlled means continuing in operation until restored by the energization of the track rails at the other end of the same track section, and means responsive to the energization of the track relay for either track section for rendering ineffective the code transmitting means for that section and providing a sustained energization of the track rails of the adjoining section to restore the corresponding manually controlled means.

19. In a coded track circuit signaling system for a stretch of track divided into track sections, a code following track relay for each end of each track section, code transmitting means for each end of each track section including a transmitter relay and intermittently operated coding contacts, said transmitting means being operable to apply code pulses to the track rails only if the corresponding code following track relay remains deenergized, means associated with each of the adjoining ends of the adjacent track sections and operable in response to the coding operation of the corresponding track relay provided the track relay at the adjoining end of the adjacent track section is being operated by code pulses for operating the transmitting relay for said adjoining end independently of the coding operation of its associated track relay and until such operation ceases, and manually controlled means for initiating operation of the code transmitting means for the extreme ends of said stretch regardless of the coding operation of the associated track relay for a time until that track relay becomes deenergized, whereby coding in either direction in the successive track sections may be overpowered and reversed by manually initiating transmission of code pulses at the end of the stretch then receiving code pulses.

20. In a coded track circuit signaling system of the character described for a stretch of track having a signal at each end governing train movement into the stretch, a signal clearing relay and a code sending relay for each end of the stretch, a code communication system of centralized control including a field station for each end of said stretch for manually governing the indication of said signal clearing and code sending relays, each of said field stations acting in response to different control codes of the communication system to energize either the corresponding signal clearing relay or the corresponding code sending relay respectively, a control lever in the control office for each of said signals, and means acting when a given control lever is actuated to clear one of said signals to automatically cause transmission of control codes on different operating cycles to each of said field stations and thereby cause energization of the signal clearing relay for said signal and the code sending relay at the opposite end of the stretch.

21. In a coded track circuit signaling system of centralized traffic control for a stretch of track having signals at the ends governing train movement into the stretch, a code communication system of centralized control including control levers for each of said signals for transmitting from a distant control office to a field station at each end of said stretch code elements of different character on certain steps of an operating cycle in accordance with the position of said lever for clearing the corresponding signal or putting it to stop, a code sending relay associated with each field station and acting when energized to cause transmission of code pulses over the track rails of the stretch for governing the clearing of the signal at the other end of the stretch, and means acting automatically when a given one of said levers is positioned for transmission of a signal clearing control code to one field station and also for transmitting during another operating cycle a distinctive code on said certain steps to the other field station to cause energization of said code sending relay at that other field station.

22. In a coded track circuit system for a track section having a signal at each end governing train movement into the track section, means normally acting to transmit code pulses in a prevailing direction over the track rails of said track from one end, means at the other end of said track section responsive to the cessation of said driven code pulses for transmitting driven code pulses from that end only until the driven code pulses in the prevailing direction are restored, a signal clearing relay for each signal manually energized selectively from a distant control office, means at said other end of the track section and effective only if the corresponding signal clearing relay is deenergized for transmitting over the track rails of said track section to said one end inverse code pulses during the off intervals of said driven code pulses in the prevailing direction, and means at said one end responsive to the energization of the corresponding signal clearing relay and effective only if said inverse code pulses are being received at that end for stopping transmission of said driven code pulses in the prevailing direction and thereby reversal in the direction of the driven code pulses to govern the indication of the signal at said one end.

23. In a coded track circuit signaling system for single track railroads having a passing siding with a power operated switch at each end, an entering signal at each end of said siding governing train movement over the corresponding switch in the reverse or normal position into said siding or the siding section opposite said siding respectively, manually controlled means for governing the position of each switch and the clearing of the associated entering signal, means for normally transmitting driven code pulses over the siding section in one prevailing direction and inverse code pulses in the opposite direction, and means effective, when manual control to clear either entering signal is exercised but only if the corresponding switch is governed to assume the normal position, for stopping the transmission of driven code or inverse code respectively towards the opposite end of said siding section.

24. In a coded track circuit signaling system for single track railroads having a siding section opposite a passing siding, an entering signal at each end of said siding section governing train movement into that section, code transmitting means operable to transmit driven code pulses over the track rails of said siding section in one selected direction only to govern the indications of said entering signals, means manually controlled from a distant control office for governing the clearing of either selected entering signal and causing operation of the code transmitting means for the opposite end of the siding section, and means effective when either entering signal has been cleared for preventing transmission of the code pulses from the corresponding end of the siding section for an interval of time after such signal has been put to stop manually, whereby said entering signals cannot be cleared by manual control in quick succession.

25. In a coded track circuit signaling system for single track railroads having a passing siding with a power-operated track switch at each end, an entering signal at each end of said siding governing train movement over the corresponding switch in the normal or reverse position into the siding section or passing siding; signal control means manually energized from a distant control office for governing the operated position of said switches and the clearing of said signals, means manually acting to transmit driven code pulses over the track rails of the siding section in a prevailing direction from one end and driven code pulses in the opposite direction when said driven code pulses in said prevailing direction cease, means associated with the other end of said siding section for transmitting inverse code pulses during the "off" intervals of the driven code pulses, and code governing means responsive to the energization of the signal control means for either selected entering signal for stopping transmission of code pulses from that end unless the corresponding switch is controlled to a reverse position, said code governing means at said one end acting only if inverse code pulses are being received.

26. In a coded track circuit signaling system for a stretch of track having a signal at each end governing train movement into the stretch, means manually governed from a distant control office for causing transmission of code pulses over the track rails of said stretch in either selected direction for governing the indication of the signal at the end of the stretch receiving such code pulses, means including an indication control relay at each end of the stretch for indicating in said control office the presence of a train in said stretch, and means responsive to the cessation of code pulses being received at either end of said stretch except when code pulses are applied at that end by manual control for energizing the corresponding indication control relay until code pulses are again received.

27. In a coded track circuit signaling system of centralized traffic control of the character described, the combination with a stretch of track divided into a plurality of track sections and having signals at intervals governing traffic into and through said stretch in both directions, means including a code sending relay for each end of said stretch and manually controlled from a distant control office for selectively causing transmission of code pulses over the track rails of the several track sections in one direction or the other only, means including an indication control relay at each end of the stretch for indicating in the control office the presence of a train in the stretch, and means responsive to the cessation of code pulses being received at either end of the stretch, unless the corresponding code sending means is effective, for energizing the corresponding indication control relay.

28. In a coded track circuit system for a stretch of track divided into three track sections, means for transmitting code pulses over the track rails of said track sections to either end of the stretch and providing code pulses at the end of the stretch having a rate dependent upon the presence of a train in different track sections of the stretch, a particular code rate being received at an end of the stretch only if all track sections of the stretch are not occupied and another code rate being received if two track sections are not occupied, a signal at each end of the stretch, decoding means separately responsive to said particular code rate and said another code rate for governing the clear indication of each signal when either of said code rates is received, and means governed by the decoding means responsive to said particular code for indicating in a distant control office the presence of a train in said stretch.

29. In a coded track circuit signaling system of centralized traffic control, the combination with a track section, a code transmitter relay for each end of said track section operable to connect a source of current across the track rails intermittently, manually controlled means for rendering operable the transmitter relay at either selected end of said track section, a series relay in series with a source of current and energized by the presence of a train in said track section when said source of current is connected to the track rails, and means including said series relay for indicating in the control office the occupied or unoccupied condition of said track section.

30. In a coded track circuit system of centralized traffic control for a stretch of track divided into a plurality of track sections, means manually controlled from a distant control office for causing transmission of driven code pulses over the track rails of the successive track sections in either selected direction, said code pulses received at either end of the stretch having a particular code rate only if all of the track sections are not occupied, means including an indication control stick relay for each end of the stretch for providing indications of occupancy in the distant control office, a pick-up circuit for each indication control relay closed by the entrance of a train into the stretch at the corresponding end, and a stick circuit for each indication control relay maintained closed until the stretch becomes unoccupied and code pulses at said particular code rate are received at the corresponding end.

31. In a coded track circuit signaling system of the character described, a stretch of track divided into track sections, means associated with each track section for transmitting code pulses in one selected direction only dependent upon the existence of code pulses in the same direction in an adjacent track section, such code pulses in an end track section toward the corresponding end of the stretch being of a particular rate only if all track sections of the stretch are not occupied, means manually controlled from a distant control office for causing transmission of code pulses from either selected end of said stretch and thereby establish coding in a corresponding direction in all the track sections of the stretch, occupancy indicating means in said control office, means responsive to the cessation of coding at either end of the stretch by occupancy of the stretch by a train for transmitting an indication code to the control office to render said occupancy indicating means effective, said occupancy indicating means when thus rendered effective to indicate occupancy of the stretch remaining in that condition until restored, and means responsive to the reception of code pulses of said particular rate at either end of the stretch for transmitting a different indication code to the control office to restore said occupancy indicating means to normal, whereby an indication of occupancy may be given by cessation of coding at either end of the stretch and cancelled by the subsequent reception of said particular code rate at the same or opposite end.

32. In a coded track circuit signaling system for railroads, the combination with a track section having a code following track relay at one end, code transmitting means operable when effective to apply code pulses to the track rails of said track section at said end, and means for setting said code transmitting means into operation in response to the energization of said track relay by a single pulse and for discontinuing such operation in response to a subsequent pulse.

33. In a coded track circuit signaling system of the character described, the combination with a track section, of means including a source of current, a code following track relay and a transmitter relay associated with one end of said track section, said transmitter relay acting to connect said source of current and said track relay alternately across the track rails of said track section, coding contacts operating intermittently at the recurrent intervals, code sending means acting when effective to connect said transmitter relay with said coding contacts, and means responsive to an energization of said track relay followed by a period of deenergization longer than a predetermined time interval for rendering said code transmitting means effective until such track relay is subsequently energized, whereby operation of said transmitter relay by said coding contacts may be initiated by a single start pulse, and discontinued by a subsequent shut-down pulse or a series of code pulses occurring at less than said predetermined time interval.

34. In a signalling system of the character described, a code following track relay and code transmitting means associated with each end of a stretch of track, means responsive to the energization of either track relay for rendering the corresponding code transmitting means effective after deenergization of that track relay for an interval longer than the interval between code pulses provided by said transmitting means, and means responsive to the energization of the track relay while the corresponding code transmitting means is effective for restoring that code transmitting means to its inactive condition.

35. In a coded track circuit signaling system for railroads, the combination with a track section, code transmitting means for each end of said track section operable when effective to apply code pulses across the track rails of said track section at that end, a code sending stick relay at each end of said track section acting when energized to render the corresponding code transmitting means effective, a code following track relay for each end of said track section connected across the track rails while the corresponding code transmitting means is not applying a code pulse, means responsive to an energization of each track relay for energizing the corresponding code sending relay, and means responsive to an energization of each track relay while the corresponding code sending relay is energized for causing deenergization of that code sending relay.

36. In a coded track circuit system of centralized traffic control for a stretch of track having signals at the ends governing train movement in opposite directions into said stretch, a code communication system of centralized control including a field station located at each end of said stretch for transmitting control codes under manual control from a distant control office for governing the clearing of said signals, code transmitting means for each end of said stretch rendered effective by the transmission of a start pulse over the track rails of the stretch from the opposite ends, code receiving means for each end of said stretch including decoding means responsive to different code rates, a signal clearing relay for each of said signals governed by the control codes under manual control transmitted by said code communication system and acting if energized to render said decoding means effective to govern the indications of the associated signal, and means responsive to the reception of a control code to energize a signal clearing relay for clearing a signal at either selected end of the stretch for applying a start pulse of limited duration to the track rails of the stretch at the corresponding end.

37. In a coded track circuit system for a stretch of track divided into a plurality of track sections each provided with code transmitting and receiving apparatus, means manually controlled from a distant control office for initiating transmission of code pulses over the track rails of the several track sections in one selected direction or the other and maintaining such transmission until restored, said code transmitting and receiving means for the several track sections acting to transmit to the end of the stretch a code at a particular code rate only when all of the track sections are not occupied, and means manually governed from the control office and dependent upon the reception of code pulses at said particular code rate for causing temporary energization of the track rails at the end of the stretch receiving such code pulses, and means responsive to such temporary energization for rendering each code transmitting means inactive, whereby coding is automatically stopped when the stretch becomes unoccupied unless a manual control requiring continued coding is effective.

38. In a coded track circuit signaling system for a stretch of track, code transmitting means for each end of said stretch operable to transmit code pulses over the track rails of said stretch toward the opposite end, means manually governed from a distant control office for initiating operation of said code transmitting means at either selected end of said stretch, means associated with each end of the stretch and including a code following track relay and a slow-release code responsive relay energized by the coding operation of said track relay, each of said code transmitting means when set into operation by manual control continuing in operation until the corresponding track relay is energized, and means for at times energizing the track rails at either end of said stretch for a time governed by the release time of the associated code responsive relay and thereby stop operation of the code transmitting means for the opposite end of the stretch.

39. In a coded track circuit system of the character described for a stretch of track having signals at each end governing train movement into the stretch, means including a code following track relay for governing the indications of each signal, code transmitting means for each end of said stretch operable to apply code pulses to the track rails at the corresponding end to govern the indications of the signal at the other end, means manually controlled from a distant control office for initiating operation of said code transmitting means at either selected end of the stretch, each of said code transmitting means when thus manually set into operation continuing in operation until restored by the energization of the corresponding track relay, a signal clearing relay for each signal energized or deenergized by manual control from a distant control office and automatically deenergized by movement of a train past the corresponding signal in the direction of traffic governed thereby and means for each end of said stretch operable in response to the reception of code pulses at that end when the stretch is not occupied and effective only if the corresponding signal clearing relay has been energized and then deenergized by manual control or train movement for energizing the track rails of the stretch at that end for a limited time to energize the track relay at the other end and render ineffective the code transmitting means at that other end.

40. In a coded track circuit signaling system for a stretch of track divided into track sections and having a signal at each end governing train movement into the stretch, means for each end of the stretch including a code following track relay for governing the indications of the corresponding signal, code transmitting means for each end of the stretch operable when effective to apply code pulses to the track rails of the stretch at the corresponding end, each of said code transmitting means when rendered effective continuing in operation until the corresponding track relay becomes energized, means controlled from a distant control office for governing the clearing of the signal at either selected end of said stretch and for also initiating operation of the code transmitting means for the opposite end of the stretch, and means for each end of the stretch acting in response to the reception of code pulses at that end and effective only if no manual signal clearing control for that end is in effect and the entire stretch is not occupied to apply a shutdown pulse of limited duration to track rails of the stretch at that end, and thereby cause energization of the track relay at the opposite end to stop operation of its associated transmitting means.

41. In a coded track circuit signaling system for railroads, the combination with a stretch of track having a signal at each end governing train movement into the stretch, means including a code following track relay for governing the indications of each signal in response to the code pulses transmitted over the track rails of the stretch, code transmitting means for each end of the stretch operable when effective to apply driven code pulses to the track rails at that end, each of said code transmitting means when rendered effective continuing in operation until the corresponding track relay is energized, means manually governed from a distant control office for controlling of the signal at either selected end of the stretch and also initiating operation of the code transmitting means for the opposite end, and means acting when a manual clearing control of a signal is not effective and code pulses are being received at that signal for applying a shutdown pulse of limited duration to cause energization of the track relay at the opposite end of the stretch and discontinue operation of its associated code transmitting means.

42. In a coded track circuit signaling system of the character described, a stretch of track including a forward track section, signals for governing train movement from the rear track section into the forward track section, a code following track relay for the forward track section, code transmitting means for the rear track section, relay means having a pick-up circuit closed by the coding operation of the track relay for the forward track section, for rendering effective code transmitting means for the rear track section and thereby transmit code pulses over the track rails of said rear track section in a direction away from said signal, a stick circuit for said relay means closed when coding operation of said track relay ceases and a limited time after said pick-up circuit for said relay means is broken, and means responsive to the presence of a train in the rear section during transmission of said driven code pulses in said rear section for closing an auxiliary stick circuit for said relay means, whereby said relay means is maintained energized when a train passes said signal in the direction of traffic governed thereby so as to maintain the code in the rear track section for following train movements, but is deenergized when coding in the forward track section is otherwise cut off.

43. In a coded track circuit signaling system for single track railroads having a stretch of single track between the ends of passing sidings and siding sections opposite said sidings, a head-block signal and an entering signal at the ends of each passing siding for governing train movement into the corresponding single track stretch and siding section respectively, code transmitting means and code receiving means for governing the indications of said signals by code pulses transmitted over the track rails, said code transmitting means for said siding section normally acting to transmit driven code pulses in one prevailing direction and inverse code pulses at the opposite direction during the off intervals of said driven code pulses, said code transmitting means for the end of the siding section normally receiving driven code pulses also acting to apply driven code pulses at the end when driven code pulses in said prevailing direction cease, means manually controlled from a distant control office for governing the clearing of a head-block signal at either selected end of the single track stretch and also causing operation of the code transmitting means for the opposite end of that stretch, and other means manually controlled from said control office for governing the clearing of the entering signal at either selected end of the siding section and stopping operation of the code transmitting means at the same end, said other manually controlled means being effective to stop transmission of driven code pulses in the siding section in the prevailing direction only if inverse code pulses are being received from the opposite end.

44. In a coded track circuit system for a stretch of single track between the ends of passing sidings and divided into more than two track sections, a signal at one end of said stretch governing train movement into the stretch, means for transmitting code pulses over the track rails of said track sections of a code rate dependent upon the number of unoccupied track sections ahead, said means providing in the end track sections of the stretch code pulses of either of two different rates both capable of giving the same clear indication of the associated signal, said means also providing code pulses at a particular rate only if the stretch is unoccupied, decoding means associated with said signal for governing its indications and distinctively responsive to code pulses of said particular rate, indicating means including a changeable indicator at a distant control office and rendered active by the entrance of a train into said stretch for indicating occupancy of the stretch, and means for restoring said indicating means to its inactive condition only when the stretch becomes unoccupied and said decoding means responds to code pulses at said particular rate.

45. In a coded track circuit system for a stretch of single track between the ends of passing sidings divided into a plurality of track sections, coding means for the respective track sections manually controlled from a distant control office for at times transmitting code pulses in either selected direction over the track rails of each track section in turn dependent upon coding in the same direction in the next adjoining track section, said code transmitting means cooperating to provide in the end track sections of the stretch any one of three different code rates dependent upon the number of unoccupied track sections of the stretch, said means acting only if the stretch is not occupied to provide driven code pulses at a particular one of said code rates at the entrance end of the stretch for the selected direction, a signal at each end of the stretch for governing train movement into the stretch, decoding means for each end of the stretch for governing the indications of the associated signal and including relay means energized only when said particular code rate is being received at the corresponding end of the stretch, and indicating means in the control office governed by said relay means for indicating the unoccupied or occupied condition of the stretch as a whole dependent upon whether or not said relay means is energized by said particular code rate.

46. In a coded track circuit system for a stretch of single track divided into a plurality of track sections and including an outlying switch connected with one of said track sections, code transmitting means associated with the respective track sections and manually controlled from a distant control system for at times causing transmission of code pulses toward one selected end of the stretch only if said stretch is not occupied, occupancy indicating means in said control office, means effective when said outlying switch is operated for stopping transmission of said driven code pulses toward said selected end of the stretch, and code responsive means for each end of the stretch responding to the cessation of the driven code pulses being received at that end of the stretch for rendering said occupancy indicating means effective whenever a train enters said stretch at the corresponding end or said outlying switch is operated.

47. In a coded track circuit system for a stretch of single track between the ends of passing sidings divided into a plurality of track sections and including an outlying switch connected with one of said track sections, means associated with the respective track sections and manually controlled from the distant control office for at times transmitting driven code pulses over the track rails of each track section only if code pulses are being transmitted into the same direction in the next adjoining track section, indicating means in the control office for indicating occupancy of the stretch, code responsive means for each end of the stretch governed by the code pulses being received at that end for rendering said indicating means active whenever said code pulses being received are cut off by the entrance of a train into the stretch at the corresponding end or from said outlying switch, said code responsive means also restoring said indicating means to its inactive condition only when a predetermined portion of the stretch becomes unoccupied and code pulses of a particular code rate are received at the corresponding end of the stretch.

48. In a coded track circuit signaling system for a main track siding section located opposite a passing siding and having a power-operated switch at each end, a signal at each end of said siding section governing train movement into that section, code transmitting means and code receiving means for the ends of said siding section normally cooperating when said signals are at stop and the siding section is not occupied to provide a driven code in a predetermined direction and an inverse code in the opposite direction during the off intervals of such driven code, switch control means for each switch manually controlled from a distant control office to a normal or a reverse position, and signal control means for each signal selectively controlled manually from said control office for rendering the associated code transmitting means ineffective only if the associated switch control means is in the normal position.

49. In a coded track circuit signaling system for railroads, the combination with a track section, coding means for each end of said track section manually governed from a distant control office for at times intermittently connecting the source of current across the track rails of said track section at the corresponding end to provide code pulses toward the opposite end, a series relay connected across the track rails at one end of said track section by the operation of the associated coding means in series with the associated source of current, said series relay being effectively energized only when said track section is occupied by a train, occupancy indicating means in said control office, and means including said series relay for rendering said indicating means active while said track section is occupied by a train.

50. In a coded track circuit centralized traffic controlling system for railroads, a stretch of track including a track section, a normally at rest code communication system including line wires connecting said track section with a control office and operable when set into operation to transmit distinctive indication codes over said line wires corresponding with the occupied or unoccupied condition of said track section, indicating means in said control office governed by said indication codes, coding means for said track section manually governed from said control office by said communication system for at times connecting a source of current and a series relay in series therewith intermittently across the track rails of said track section at one end, said series relay being effectively energized only by the presence of a train in said track section, and means including said series relay for initiating operation of said code communication system and for determining the character of the indication code transmitted by the code communication system as said series relay responds to the presence or absence of a train in said track section.

51. In a coded track circuit signaling system for a stretch of track including a coded track circuit section and an adjacent detector track section having a normally energized detector track relay, a code transmitter relay for connecting a source of current and a series relay in series therewith across the track rails of said coded track circuit section adjoining said detector track section, said series relay being effectively energized only if said coded track circuit section is occupied by a train, coding contacts for operating said transmitter relay, a coding circuit for operatively connecting said transmitter relay with said coding contacts, means manually controlled from a distant control office for opening and closing said coding circuit, means responsive to the deenergization of said detector track relay for opening said coding circuit and for energizing it steadily and thereby permit energization of said series relay as soon as a train enters said coded track circuit section while preventing operation of said transmitter relay by its coding contacts, indicating means in said control office for indicating occupancy, and means including said series relay for rendering said indicating means active while said coded track circuit section is occupied by a train.

52. In a coded track circuit signaling system for a stretch of single track including a track section having a head-block signal and an intermediate signal governing train movement in opposite directions into said track section, code transmitting means for each end of said track section including intermittently operated coding contacts and operable to transmit over the track rails of said track section signal control code pulses toward the opposite end of said track section, means including a code following track relay at each end of said track section for rendering the associated code transmitting means ineffective when code pulses are received at that end of the track section, means effective when a train passing said head-block signal has advanced beyond said intermediate signal for rendering the code transmitting means at said intermediate signal effective to send code pulses toward said head-block signal for clearing the following train movements, manually controlled means for governing the clearing of said head-block signal and manually controlled means effective only if said head-block signal is controlled to indicate stop for rendering the code transmitting means at that signal effective while the stretch is occupied by a train and in spite of the reception of code pulses, thereby causing transmission of code pulses toward said intermediate signal for governing the clearing of that signal for a train to make a back-up move and also rendering ineffective the associated code transmitting means.

53. In a coded track circuit signaling system for a stretch of single track having an end track section at one end, a head-block signal at said one end of the stretch and an opposing intermediate signal governing train movement in opposite directions into said end track section, code transmitting means for the opposite ends of said end track section operable only if no code pulses are being received at that end for transmitting signal control code pulses toward the opposite end, means effective when a train entering said stretch at said one end has advanced beyond said intermediate signal for rendering the associated code transmitting means effective to transmit code pulses behind such train for clearing the head-block signal for a following train movement, an entering signal at said one end of the stretch governing train movement out of the stretch, means manually controlled from a distant control office for selectively governing the clearing of said head-block signal and said entering signal, means effective when manual control to clear said entering signal is exercised to render the code transmitting means for the corresponding end of the stretch effective in spite of the reception of code pulses to send code pulses toward said intermediate signal and stop transmission of code pulses from that signal, and code responsive means at said intermediate signal for governing the indications thereof in accordance with the character of the code pulses received.

NEIL D. PRESTON.